US012352900B2

(12) United States Patent
Droz et al.

(10) Patent No.: US 12,352,900 B2
(45) Date of Patent: Jul. 8, 2025

(54) LIGHT DETECTION AND RANGING (LIDAR) DEVICE HAVING A LIGHT-GUIDE MANIFOLD

(71) Applicant: Waymo LLC, Mountain View, CA (US)

(72) Inventors: Pierre-Yves Droz, Los Altos, CA (US); Ralph H. Shepard, Menlo Park, CA (US); Augusto Tazzoli, San Jose, CA (US); David Hutchison, Santa Clara, CA (US); David Schleuning, Piedmont, CA (US); Nathaniel Golshan, San Francisco, CA (US); Nathaniel Quillin, Palo Alto, CA (US); Andrew Abo, Mountain View, CA (US); Caner Onal, Palo Alto, CA (US); Michael Tom, Milpitas, CA (US); Robert Lockwood, San Carlos, CA (US); Kelvin Kwong, San Jose, CA (US); Daiwei Li, San Jose, CA (US); Drew Ulrich, San Francisco, CA (US); Simon Ellgas, San Jose, CA (US); Chandra Kakani, Fremont, CA (US); Erin Eppard, Sunnyvale, CA (US); Samuel Lenius, Palo Alto, CA (US); Justin Andrade, San Jose, CA (US); James Dunphy, San Jose, CA (US)

(73) Assignee: Waymo LLC, Mountain View, CA (US)

( * ) Notice: Subject to any disclaimer, the term of this patent is extended or adjusted under 35 U.S.C. 154(b) by 1002 days.

(21) Appl. No.: 17/121,918

(22) Filed: Dec. 15, 2020

(65) Prior Publication Data

US 2022/0082660 A1 Mar. 17, 2022

Related U.S. Application Data

(60) Provisional application No. 62/951,641, filed on Dec. 20, 2019.

(51) Int. Cl.
*G01S 7/484* (2006.01)
*G01F 23/00* (2022.01)
(Continued)

(52) U.S. Cl.
CPC .......... *G01S 7/484* (2013.01); *G01F 23/0007* (2013.01); *G01S 7/4813* (2013.01);
(Continued)

(58) Field of Classification Search
None
See application file for complete search history.

(56) References Cited

U.S. PATENT DOCUMENTS 9,285,464 B2 3/2016 Pennecot et al.
9,880,263 B2 1/2018 Droz et al.
(Continued)

FOREIGN PATENT DOCUMENTS

JP 2018004372 A 1/2018
JP 2020532735 A 11/2020
(Continued)

OTHER PUBLICATIONS

International Search Report and Written Opinion for International Application No. PCT/US2021/062165; Mailed Sep. 1, 2022; 11 Pages.

(Continued)

*Primary Examiner* — Luke D Ratcliffe
(74) *Attorney, Agent, or Firm* — McDonnell Boehnen Hulbert & Berghoff LLP

(57) ABSTRACT

Example embodiments relate to light detection and ranging (lidar) devices having a light-guide manifold. An example lidar device includes a transmit subsystem. The transmit subsystem includes a light emitter. The transmit subsystem also includes a light-guide manifold optically coupled to the light emitter. Further, the transmit subsystem includes a
(Continued)

telecentric lens assembly optically coupled to the light-guide manifold. The lidar device also includes a receive subsystem. The receive subsystem includes the telecentric lens assembly. The receive subsystem also includes an aperture plate having an aperture defined therein. The aperture plate is positioned at a focal plane of the telecentric lens assembly. Further, the receive subsystem includes a silicon photomultiplier (SiPM) positioned to receive light traveling through the aperture.

26 Claims, 12 Drawing Sheets

(51) Int. Cl.
*G01S 7/481* (2006.01)
*G01S 17/89* (2020.01)
*G01S 17/931* (2020.01)

(52) U.S. Cl.
CPC .......... *G01S 7/4815* (2013.01); *G01S 7/4816* (2013.01); *G01S 7/4817* (2013.01); *G01S 17/89* (2013.01); *G01S 17/931* (2020.01)

(56) References Cited

U.S. PATENT DOCUMENTS

| | | | |
|---|---|---|---|
| 10,055,650 | B2 | 8/2018 | Yi et al. |
| 10,203,399 | B2 | 2/2019 | Retterath et al. |
| 10,481,269 | B2 | 11/2019 | Pacala et al. |
| 10,663,586 | B2 | 5/2020 | Pacala et al. |
| 10,732,268 | B1 | 8/2020 | Diehl et al. |
| 10,746,945 | B1 | 8/2020 | Droz et al. |
| 10,843,690 | B2 | 11/2020 | Shalev-Shwartz et al. |
| 2015/0192677 | A1 | 7/2015 | Yu et al. |
| 2018/0156971 | A1* | 6/2018 | Droz ..................... G01S 7/4865 |
| 2018/0284780 | A1* | 10/2018 | McWhirter ........... G01S 7/4816 |
| 2018/0292515 | A1* | 10/2018 | Paxton ..................... B05D 3/06 |
| 2019/0072649 | A1 | 3/2019 | Droz et al. |
| 2019/0118737 | A1 | 4/2019 | Li et al. |
| 2019/0195990 | A1 | 6/2019 | Shand |
| 2019/0331509 | A1* | 10/2019 | Pizzimenti ............. H04N 23/52 |
| 2019/0383916 | A1 | 12/2019 | Gutnik et al. |
| 2020/0025880 | A1 | 1/2020 | Pacala et al. |
| 2020/0033480 | A1* | 1/2020 | Augspurger .......... G01S 7/4813 |
| 2020/0041613 | A1* | 2/2020 | Pacala .................... G01S 7/4816 |
| 2020/0088859 | A1 | 3/2020 | Shepard et al. |
| 2020/0096634 | A1 | 3/2020 | Droz et al. |
| 2020/0111768 | A1 | 4/2020 | Last et al. |
| 2020/0158830 | A1 | 5/2020 | Asghari et al. |
| 2020/0191614 | A1 | 6/2020 | Ellgas et al. |
| 2021/0063093 | A1 | 3/2021 | Tobiassen et al. |
| 2021/0165094 | A1* | 6/2021 | Droz ....................... G01S 17/89 |

FOREIGN PATENT DOCUMENTS

| | | |
|---|---|---|
| KR | 10-2016-0078043 A | 7/2016 |
| KR | 10-1977315 B1 | 5/2019 |
| WO | 2018197246 A1 | 11/2018 |
| WO | 2020/180954 A1 | 9/2020 |
| WO | 2021/108242 A1 | 6/2021 |

OTHER PUBLICATIONS

"Long-range depth imaging using a single-photon detector array and non-local data fusion"; Susan Chan, et al.; Scientific Reports (May 30, 2019).

"LiDAR Fundamentals"; Claudio Bruschini et al.; Advanced Quantum Architecture Lab (AQUA); EPFL, Neuchatel, Switzerland (Jun. 20, 2019).

* cited by examiner

LIGHT DETECTION AND RANGING (LIDAR) DEVICE HAVING A LIGHT-GUIDE MANIFOLD

CROSS-REFERENCE TO RELATED APPLICATIONS

The present application claims priority to Provisional Patent Application No. 62/951,641, filed with the U.S. Patent and Trademark Office on Dec. 20, 2019, the contents of which are hereby incorporated by reference.

BACKGROUND

Unless otherwise indicated herein, the materials described in this section are not prior art to the claims in this application and are not admitted to be prior art by inclusion in this section.

Light detection and ranging (lidar) devices may estimate distances to objects in a given environment. For example, an emitter subsystem of a lidar device may emit near-infrared light pulses, which may interact with objects in the device's environment. At least a portion of the light pulses may be redirected back toward the lidar (e.g., due to reflection or scattering) and detected by a detector subsystem. Conventional detector subsystems may include a plurality of detectors and a corresponding controller configured to determine an arrival time of the respective light pulses with high temporal resolution. The distance between the lidar device and a given object may be determined based on a time of flight of the corresponding light pulses that interact with the given object.

SUMMARY

The disclosure relates to lidar devices that have an array of light emitters and a corresponding array of light detectors. Light signals may be emitted by the light emitters through a shared telecentric lens. Such light signals may reflect from objects in a surrounding environment, be again transmitted through the shared telecentric lens, and then detected by the light detectors. The lidar devices may also include other optics (e.g., light-guide manifolds, astigmatic lenses, and an aperture plate). Using the emission power, time of emission, detection power, and time of detection, one or more features of the surrounding environment can be determined (e.g., a three-dimensional point cloud can be generated based on the emission times and corresponding detection times).

In one aspect, a light detection and ranging (lidar) device is provided. The lidar device includes a transmit subsystem. The transmit subsystem includes a light emitter. The transmit subsystem also includes a light-guide manifold optically coupled to the light emitter. Further, the transmit subsystem includes a telecentric lens assembly optically coupled to the light-guide manifold. The lidar device also includes a receive subsystem. The receive subsystem includes the telecentric lens assembly. The receive subsystem also includes an aperture plate having an aperture defined therein. The aperture plate is positioned at a focal plane of the telecentric lens assembly. Further, the receive subsystem includes a silicon photomultiplier (SiPM) positioned to receive light traveling through the aperture.

In another aspect, a light detection and ranging (lidar) device is also provided. The lidar device includes an array of light emitters controlled by a firing circuit. The lidar device also includes an array of astigmatic lenses configured to couple light signals from the array of light emitters into a corresponding array of light-guide manifolds. Further, the lidar device includes a shared telecentric lens assembly configured to receive light signals from the light-guide manifolds and transmit the light signals toward an environment surrounding the lidar device. In addition, the lidar device includes an array of light detectors. Each of the light detectors corresponds to one of the light emitters. Still further, the lidar device includes an aperture plate having an array of apertures defined therein. Each aperture in the array of apertures corresponds to one of the light detectors. The shared telecentric lens assembly is configured to receive light signals reflected from objects in the environment surrounding the lidar device and transmit the light signals reflected from objects in the environment surrounding the lidar device to the array of light detectors through the array of apertures. The aperture plate is positioned at a focal plane of the shared telecentric lens assembly.

In another aspect, a method is provided. The method includes emitting, from a light emitter of a lidar device, a light signal. The method also includes coupling the light signal into a light-guide manifold of the lidar device. Further, the method includes propagating the light signal through the light-guide manifold. In addition, the method includes receiving, at a telecentric lens assembly of the lidar device, the light signal. Even further, the method includes transmitting, from the telecentric lens assembly to an environment outside the lidar device, the light signal. Yet further, the method includes receiving, at the telecentric lens assembly, a reflection of the light signal from one or more objects within the environment. Additionally, the method includes coupling the received reflection from the telecentric lens assembly through an aperture defined within an aperture plate. The aperture plate is positioned at a focal plane of the telecentric lens assembly. Still further, the method includes detecting, at a silicon photomultiplier (SiPM), the received reflection.

In yet another aspect, another method is provided. The method includes emitting, from an array of light emitters controlled by a firing circuit, a plurality of light signals. The method also includes coupling, using an array of astigmatic lenses corresponding to the array of light emitters, the plurality of light signals into an array of light-guide manifolds. The light-guide manifolds correspond to the array of light emitters. Further, the method includes propagating the plurality of light signals through the light-guide manifolds. In addition, the method includes receiving, at a shared telecentric lens assembly, the plurality of light signals. Still further, the method includes transmitting, to a surrounding environment from the shared telecentric lens assembly, the plurality of light signals. Even further, the method includes receiving, at the shared telecentric lens assembly, reflections of the plurality of light signals from one or more objects within the surrounding environment. Yet further, the method includes coupling the received reflections from the shared telecentric lens assembly through an aperture plate having an array of apertures defined therein. Each aperture in the array of apertures may correspond to a light detector within an array of light detectors. The aperture plate is positioned at a focal plane of the shared telecentric lens assembly. Even still further, the method includes detecting, at the light detectors, the received reflections.

In an additional aspect, a non-transitory, computer-readable medium having instructions stored therein is provided. The instructions, when executed by a processor, perform a method. The method includes controlling a firing circuit to cause a light emitter of a lidar device to emit a light signal. When the light signal is emitted, the light signal is coupled into a light-guide manifold of the lidar device. In addition, when the light signal is emitted, the light signal is propagated through the light-guide manifold. Further, when the light signal is emitted, the light signal is received at a telecentric lens assembly of the lidar device. Still further, when the light signal is emitted, the light signal is transmitted from the telecentric lens assembly to an environment outside the lidar device. Additionally, when the light signal is emitted, a reflection of the light signal from one or more objects within the environment is received at the telecentric lens assembly. Yet further, when the light signal is emitted, the received reflection is coupled from the telecentric lens assembly through an aperture defined within an aperture plate. The aperture plate is positioned at a focal plane of the telecentric lens assembly. Even still further, when the light signal is emitted, the received reflection is detected at a silicon photomultiplier (SiPM). The method also includes determining, based on the detection of the received reflection, a distance to the one or more objects in the environment.

In an additional aspect, a non-transitory, computer-readable medium having instructions stored therein is further provided. The instructions, when executed by a processor, perform a method. The method includes controlling a firing circuit to cause an array of light emitters to emit a plurality of light signals. When the plurality of light signals are emitted, the plurality of light signals are transmitted into an array of light-guide manifolds using an array of astigmatic lenses corresponding to the array of light emitters. The light-guide manifolds in the array of light-guide manifolds correspond to the array of light emitters. The plurality of light signals are propagated through the light-guide manifolds. Further, when the plurality of light signals are emitted, the plurality of light signals are received at a shared telecentric lens assembly. The plurality of light signals are then transmitted from the shared telecentric lens assembly to a surrounding environment. Reflections of the plurality of light signals from one or more objects within the surrounding environment are received at the shared telecentric lens assembly. The received reflections are transmitted from the shared telecentric lens assembly through an aperture plate having an array of apertures. Each aperture in the array of apertures corresponds to a light detector within an array of light detectors. The aperture plate is positioned at a focal plane of the shared telecentric lens assembly. Still yet further, when the plurality of light signals are emitted, the received reflections are detected at the light detectors. The method also includes determining, based on the detections of the received reflections, a distance to the one or more objects in the surrounding environment.

These as well as other aspects, advantages, and alternatives will become apparent to those of ordinary skill in the art by reading the following detailed description, with reference, where appropriate, to the accompanying drawings.

DETAILED DESCRIPTION

Figure 1:
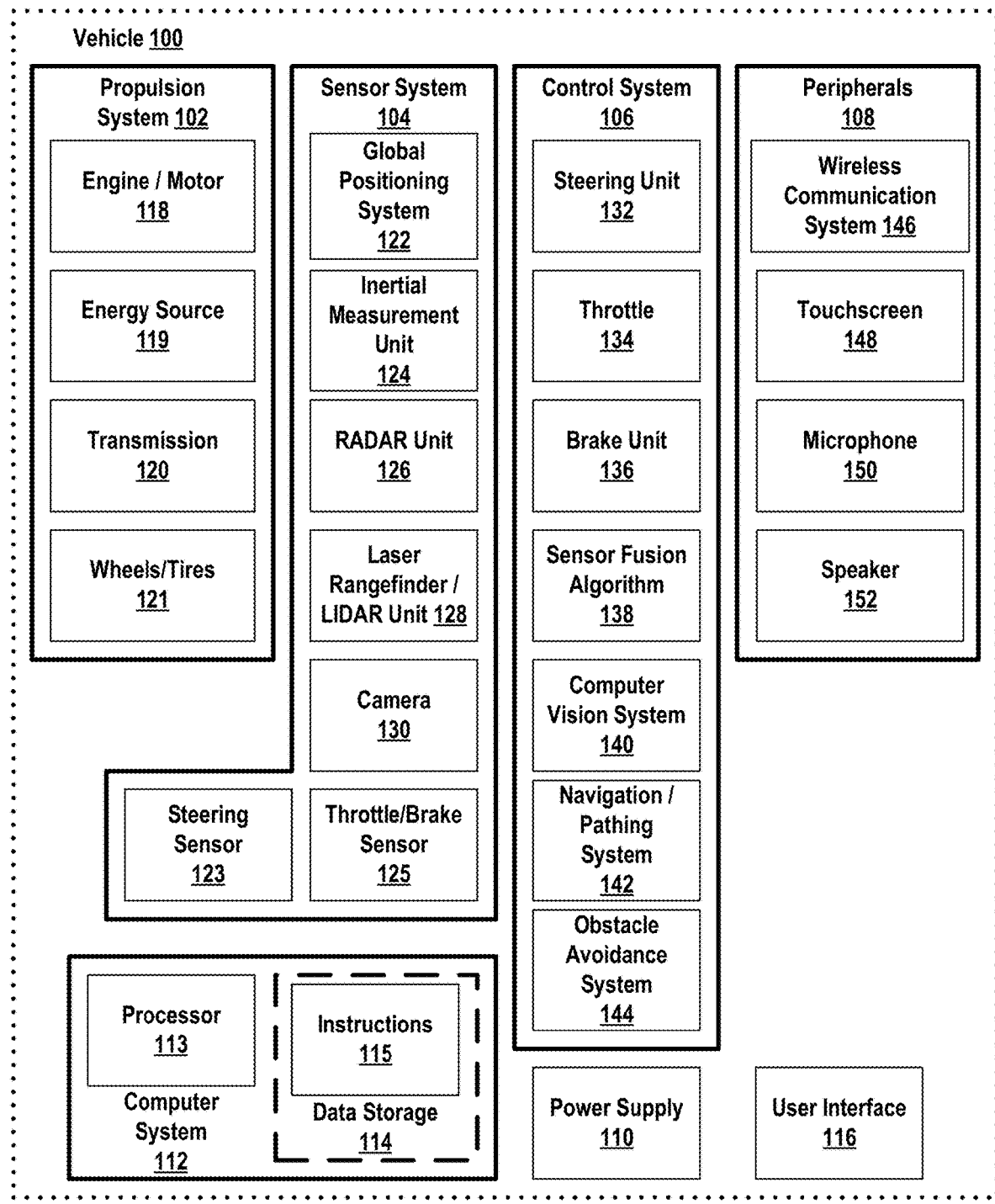
FIG. 1 is a functional block diagram illustrating a vehicle, according to example embodiments.
Figure 2A:
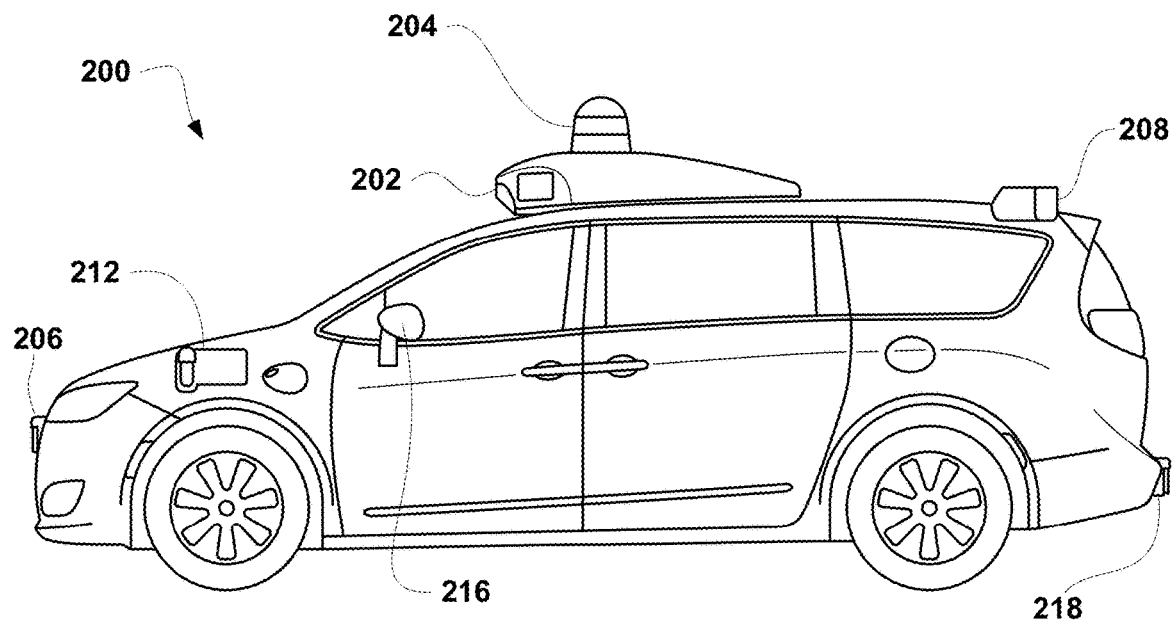
FIG. 2A is an illustration of a physical configuration of a vehicle, according to example embodiments.
Figure 2B:
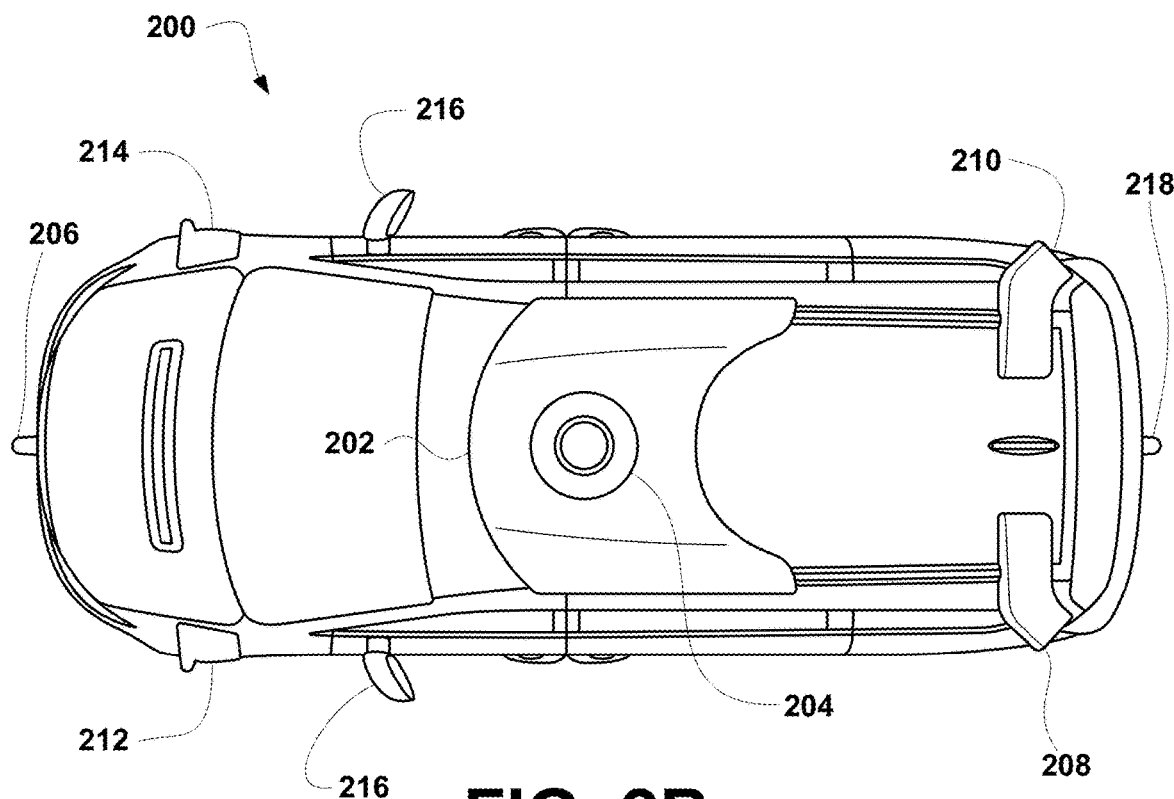
FIG. 2B is an illustration of a physical configuration of a vehicle, according to example embodiments.
Figure 2C:
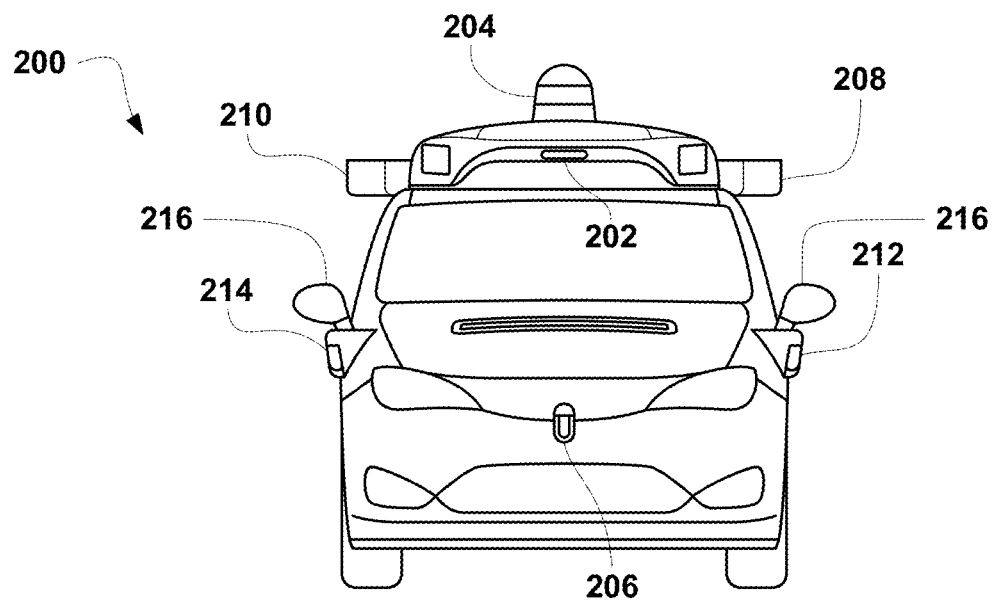
FIG. 2C is an illustration of a physical configuration of a vehicle, according to example embodiments.
Figure 2D:
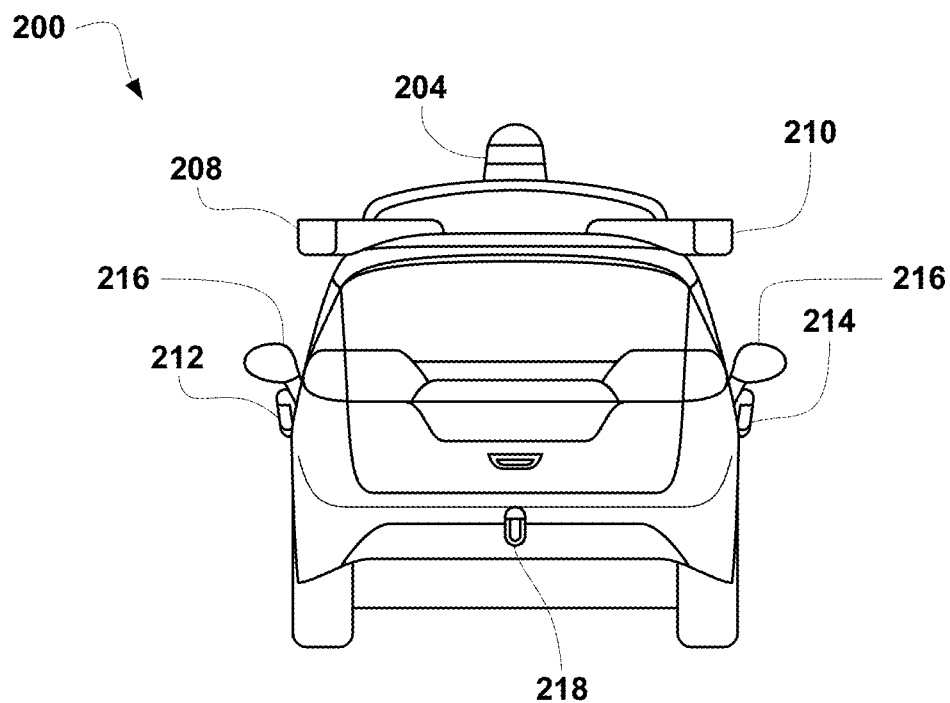
FIG. 2D is an illustration of a physical configuration of a vehicle, according to example embodiments.
Figure 2E:
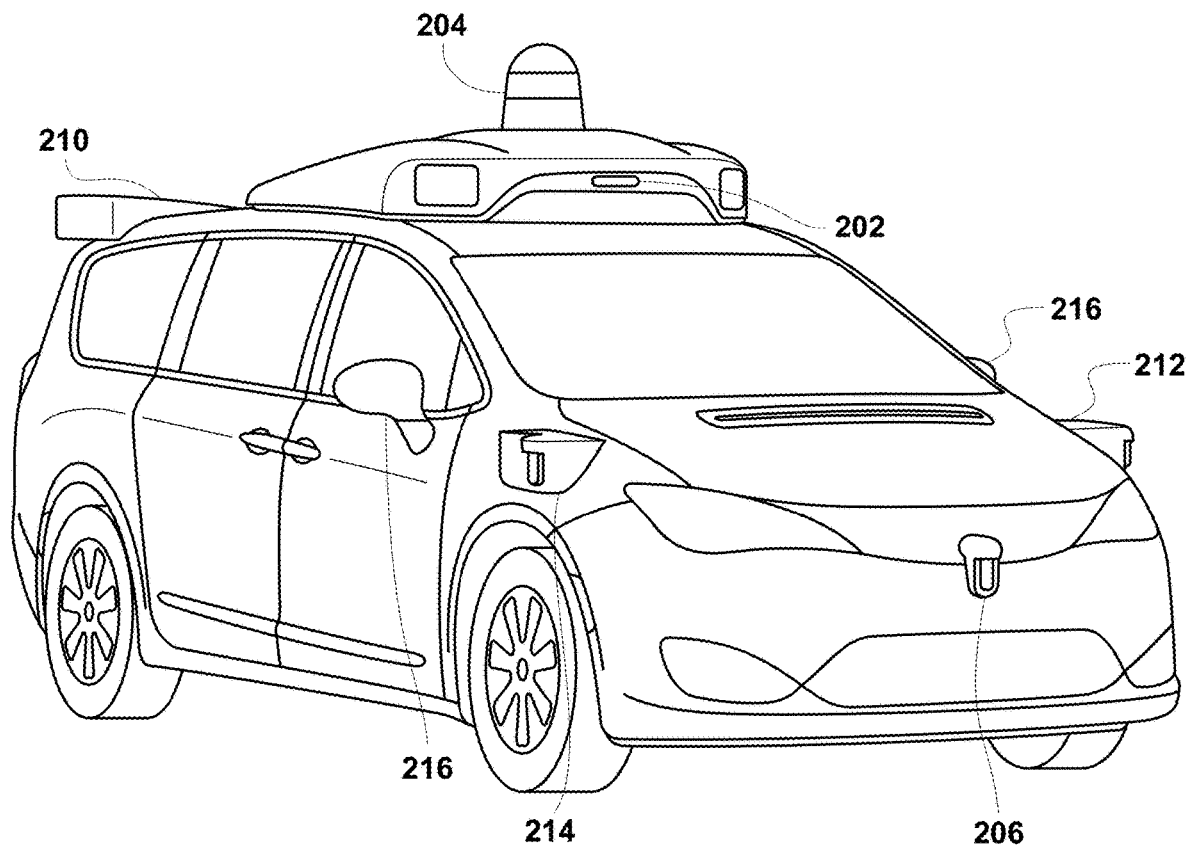
FIG. 2E is an illustration of a physical configuration of a vehicle, according to example embodiments.

Example methods and systems are contemplated herein. Any example embodiment or feature described herein is not necessarily to be construed as preferred or advantageous over other embodiments or features. The example embodiments described herein are not meant to be limiting. It will be readily understood that certain aspects of the disclosed systems and methods can be arranged and combined in a wide variety of different configurations, all of which are contemplated herein.

Furthermore, the particular arrangements shown in the figures should not be viewed as limiting. It should be understood that other embodiments might include more or less of each element shown in a given figure. Further, some of the illustrated elements may be combined or omitted. Yet further, an example embodiment may include elements that are not illustrated in the figures.

I. OVERVIEW

A lidar device may include a transmitter, a receiver, a shared optical lens assembly (e.g., a telecentric optical lens assembly), a housing, and one or more adjustable stages (e.g., movable mounts).

The transmitter could include over 200 light emitters. In some embodiments for example, the light emitters could be arranged in two groups with over 100 light-emitter devices in each group. The light emitters could include, among other possibilities, semiconductor laser-diode bars (e.g., InGaAs laser diodes and/or quantum well-based devices). The transmitter could also include pulser circuits configured to cause the corresponding light-emitter devices to emit one or more light signals (e.g., as light pulses). In some embodiments, the pulser circuits could include GaNFET-based circuits configured to trigger light pulses with a pulse width between about 1 nanosecond and about 10 nanoseconds. In some embodiments, the pulser circuits and corresponding light emitters could be fired simultaneously or with predetermined delays based on a common clock or another temporal reference. In other words, the transmitter could emit a plurality of light pulses into the environment at the same time.

In some embodiments, the light emitters could be optically coupled to a corresponding plurality of light-guide manifolds via one or more astigmatic lenses (e.g., one or more cylindrical lenses). By utilizing total internal reflection, the light-guide manifolds could be configured to guide the light signals toward corresponding reflective surfaces. The reflective surfaces could be configured to redirect the light pulses toward the shared optical lens assembly. In such scenarios, the transmitter block could include over 200 transmit channels—one for each light emitter and its corresponding light-guide manifold. Light-guide manifolds may allow the distribution of emission points of light signals across a wide surface of a device while maintaining the light-emitters in a relatively compact location. Further, light-guide manifolds may be low-loss (e.g., less than 10%, less than 5%, less than 1%, or less than 0.1% loss), which may optimize the amount of light emitted by the light emitters that are transmitted into the environment at the emission points (e.g., the ends of the light-guide manifolds). In addition, the light-guide manifolds can provide for lower-cost, more robust lidars, particularly when made using novel manufacturing techniques we developed, which are the subject of other pending patent applications.

The receiver could include one receive channel for each transmit channel (e.g., over 200 receive channels). Similar to the transmit channels, the receive channels could be arranged in two groups with over 100 receive channels in each group. Each receive channel may include an aperture (e.g., a pinhole) aligned over a light detector (e.g., a silicon photomultiplier (SiPM)). In an example embodiment, a plurality of apertures could be formed in an aperture plate so that all of the apertures could be aligned simultaneously to correspond to the plurality of SiPMs. Such an aperture plate may be positioned at a focal plane of the shared optical lens assembly. In some examples, each SiPM could include thousands of Geiger-mode operated photodetectors, e.g., over 2000 single-photon avalanche diodes (SPADs) connected in a parallel circuit configuration or in an alternative circuit configuration. The plurality of SiPMs could be coupled to a common substrate and powered by a circuit configured to enable Geiger-mode operation. The plurality of SiPMs could also be coupled to a circuit and/or controller specifically configured to translate signals from Geiger-mode operated photodetectors. In some embodiments, various structures could provide electrical and/or optical isolation between neighboring SiPMs (e.g., to reduce cross-talk between adjacent receive channels). For example, one or more baffles may optically isolate neighboring SiPMs and/or neighboring light-guide manifolds. In some embodiments, paired transmit and receive channels could be spatially arranged so that the SiPM of the receive channel is at least partially under the reflective surface (e.g., a 45-degree mirror positioned at the transmit end of the respective light-guide manifold) of the corresponding transmit channel.

As described above, both the transmit channels and the receive channels could be arranged into a plurality of groups (e.g., two groups of transmit channels and/or two groups of receive channels). The plurality of groups can provide redundancy. For example, if a first group of transmit channels malfunctions or fails (e.g., because of a power loss affecting the first group of transmit channels), the second group of transmit channels may remain completely functional. In such cases, the second group of transmit channels may be relied on to provide a proper mapping of a surrounding environment (e.g., for object detection and avoidance in a fallback autonomous vehicle operating mode), while the first group of transmit channels is deactivated, repaired (e.g., reset), and/or replaced (e.g., by using other signals in their place). In addition, the plurality of groups can be operated differently to interrogate different aspects of the surrounding environment. For example, the first group of transmit channels may emit light signals at a first wavelength while the second group of transmit channels may emit light signals at a second wavelength. Additionally or alternatively, the first group of transmit channels may emit light signals at a first polarization while the second group of transmit channels may emit light signals at a second polarization. Additionally or alternatively, the first group of transmit channels may emit light signals at a first intensity or pattern of intensity while the second group of transmit channels may emit light signals at a second intensity or second pattern of intensity. Still further, the first group of transmit channels may emit light signals at a first point in time or in a first temporal pattern while the second group of transmit channels may emit light signals at a time delay with respect to the first point in time and/or according to a second temporal pattern. The intensity pattern or temporal patterns may change over time. For example, the intensity and/or temporal pattern may change over time based on an environment through which an autonomous vehicle is driving (e.g. weather, time of day, operating design domain (ODD), type of road, road condition, density of actual or potential road users in a vicinity of the vehicle, the geographic location of the vehicle, etc.) or a driving maneuver that the autonomous vehicle is undertaking. The corresponding groups of light detectors may be configured to detect the different light signals emitted by the different groups of transmit channels and receive channels.

The shared optical lens assembly could include a multi-element telecentric lens with a focal length between 50 mm and 500 mm and an f-number between 1.5 and 3.0 (where f-number is the ratio of the shared optical lens assembly's focal length to the diameter of the entrance pupil). Other types of optical lens characteristics are possible and contemplated herein. Light signals emitted by the light emitters of the transmitter block could interact with the elements of the shared optical lens assembly so as to be directed toward an environment of the lidar device. Light signals that interact with objects in the environment could be reflected back toward the lidar device. The shared optical lens assembly could collect and focus the reflected light for optical detection by the receiver block.

In some embodiments, at least portions of the transmitter block, the receiver block, and the shared optical lens assembly could be contained within the housing. In some examples, the housing could include a weatherproof covering that may include one or more optical windows. The housing could also contain other auxiliary sensors (e.g., cameras, temperature sensors, global positioning system (GPS) sensors, radar units, pressure sensors, inertial sensors, humidity sensors, etc.) and/or communication devices configured to provide a communication interface between the lidar device and one or more computing devices (e.g., another vehicle computer and/or a cloud computing resource, such as a cloud server). In some embodiments, the housing could include one or more heated optical windows. The heated optical windows, which may be coated with indium tin oxide (ITO), could help to prevent ice or frost buildup on the optical window in cold conditions. In some embodiments, at least a portion of the housing could be coated with a hydrophilic coating and/or an anti-reflective (AR) coating. Furthermore, in some examples, the housing could be formed from black glass or similar material, which may be selected or configured to efficiently transmit light with near infrared wavelengths used by the lidar device while blocking transmission of light within the visible spectrum. Other housing materials are possible.

The adjustable stages could be configured to adjust a pointing direction of the lidar device with respect to the environment. For example, a movable mount could be coupled to the housing and may include an actuator motor. In some embodiments, the actuator motor could be configured to rotate at least a portion of the movable mount so as to adjust the pointing direction of the lidar device about one or more rotational axes (e.g., an azimuthal axis and/or an elevation axis). In such scenarios, the movable mount could adjust the pointing direction of the lidar device at a constant angular velocity in yaw and/or in pitch. Additionally or alternatively, the movable mount could be configured to adjust the pointing direction of the lidar device so as to obtain information about a region of interest in the environment.

In some embodiments, the movable mount could be coupled to a vehicle (e.g., an autonomous vehicle or a vehicle operating in an autonomous or semi-autonomous mode). Alternatively, the movable mount could be coupled to other objects, such as buildings, robots, or other structures. Additionally, in some embodiments, the pointing direction of the lidar can be adjusted in other ways (e.g., beam steering).

II. EXAMPLE SYSTEMS

The following description and accompanying drawings will elucidate features of various example embodiments. The embodiments provided are by way of example, and are not intended to be limiting. As such, the dimensions of the drawings are not necessarily to scale.

Example systems within the scope of the present disclosure will now be described in greater detail. An example system may be implemented in or may take the form of an automobile. However, an example system may also be implemented in or take the form of other vehicles, such as cars, trucks, motorcycles, buses, boats, airplanes, helicopters, lawn mowers, earth movers, boats, snowmobiles, aircraft, recreational vehicles, amusement park vehicles, farm equipment, construction equipment, trams, golf carts, trains, trolleys, and robot devices. Other vehicles are possible as well. Further, in some embodiments, example systems might not include a vehicle.

Referring now to the figures, FIG. 1 is a functional block diagram illustrating example vehicle 100, which may be configured to operate fully or partially in an autonomous mode. More specifically, vehicle 100 may operate in an autonomous mode without human interaction through receiving control instructions from a computing system. As part of operating in the autonomous mode, vehicle 100 may use sensors to detect and possibly identify objects of the surrounding environment to enable safe navigation. In some embodiments, vehicle 100 may also include subsystems that enable a driver to control operations of vehicle 100.

As shown in FIG. 1, vehicle 100 may include various subsystems, such as propulsion system 102, sensor system 104, control system 106, one or more peripherals 108, power supply 110, computer system 112 (could also be referred to as a computing system), data storage 114, and user interface 116. In other examples, vehicle 100 may include more or fewer subsystems, which can each include multiple elements. The subsystems and components of vehicle 100 may be interconnected in various ways. In addition, functions of vehicle 100 described herein can be divided into additional functional or physical components, or combined into fewer functional or physical components within embodiments. For instance, the control system 106 and the computer system 112 may be combined into a single system that operates the vehicle 100 in accordance with various operations.

Propulsion system 102 may include one or more components operable to provide powered motion for vehicle 100 and can include an engine/motor 118, an energy source 119, a transmission 120, and wheels/tires 121, among other possible components. For example, engine/motor 118 may be configured to convert energy source 119 into mechanical energy and can correspond to one or a combination of an internal combustion engine, an electric motor, steam engine, or Stirling engine, among other possible options. For instance, in some embodiments, propulsion system 102 may include multiple types of engines and/or motors, such as a gasoline engine and an electric motor.

Energy source 119 represents a source of energy that may, in full or in part, power one or more systems of vehicle 100 (e.g., engine/motor 118). For instance, energy source 119 can correspond to gasoline, diesel, other petroleum-based fuels, propane, other compressed gas-based fuels, ethanol, solar panels, batteries, and/or other sources of electrical power. In some embodiments, energy source 119 may include a combination of fuel tanks, batteries, capacitors, and/or flywheels.

Transmission 120 may transmit mechanical power from engine/motor 118 to wheels/tires 121 and/or other possible systems of vehicle 100. As such, transmission 120 may include a gearbox, a clutch, a differential, and a drive shaft, among other possible components. A drive shaft may include axles that connect to one or more wheels/tires 121.

Wheels/tires 121 of vehicle 100 may have various configurations within example embodiments. For instance, vehicle 100 may exist in a unicycle, bicycle/motorcycle, tricycle, or car/truck four-wheel format, among other possible configurations. As such, wheels/tires 121 may connect to vehicle 100 in various ways and can exist in different materials, such as metal and rubber.

Sensor system 104 can include various types of sensors, such as GPS 122, inertial measurement unit (IMU) 124, radar 126, laser rangefinder/lidar 128, camera 130, steering sensor 123, and throttle/brake sensor 125, among other possible sensors. In some embodiments, sensor system 104 may also include sensors configured to monitor internal systems of the vehicle 100 (e.g., $O_2$ monitor, fuel gauge, engine oil temperature, brake wear).

GPS 122 may include a transceiver operable to provide information regarding the position of vehicle 100 with respect to the Earth. IMU 124 may have a configuration that uses one or more accelerometers and/or gyroscopes and may sense position and orientation changes of vehicle 100 based on inertial acceleration. For example, IMU 124 may detect a pitch and yaw of the vehicle 100 while vehicle 100 is stationary or in motion.

Radar 126 may represent one or more systems configured to use radio signals to sense objects, including the speed and heading of the objects, within the local environment of vehicle 100. As such, radar 126 may include antennas configured to transmit and receive radio signals. In some embodiments, radar 126 may correspond to a mountable radar system configured to obtain measurements of the surrounding environment of vehicle 100.

Laser rangefinder/lidar 128 may include one or more laser sources, a laser scanner, and one or more detectors, among other system components, and may operate in a coherent mode (e.g., using heterodyne detection) or in an incoherent detection mode. In some embodiments, the one or more detectors of the laser rangefinder/lidar 128 may include one or more photodetectors. Such photodetectors may be avalanche photodiodes (APDs). In some examples, such photodetectors may be capable of detecting single photons (e.g., SPADs). Further, such photodetectors can be arranged (e.g., through an electrical connection in series) into an array (e.g., as in a SiPM). In some examples, the one or more photodetectors are Geiger-mode operated devices and the lidar includes subcomponents designed for such Geiger-mode operation.

Camera 130 may include one or more devices (e.g., still camera or video camera) configured to capture images of the environment of vehicle 100.

Steering sensor 123 may sense a steering angle of vehicle 100, which may involve measuring an angle of the steering wheel or measuring an electrical signal representative of the angle of the steering wheel. In some embodiments, steering sensor 123 may measure an angle of the wheels of the vehicle 100, such as detecting an angle of the wheels with respect to a forward axis of the vehicle 100. Steering sensor 123 may also be configured to measure a combination (or a subset) of the angle of the steering wheel, electrical signal representing the angle of the steering wheel, and the angle of the wheels of vehicle 100.

Throttle/brake sensor 125 may detect the position of either the throttle position or brake position of vehicle 100. For instance, throttle/brake sensor 125 may measure the angle of both the gas pedal (throttle) and brake pedal or may measure an electrical signal that could represent, for instance, an angle of a gas pedal (throttle) and/or an angle of a brake pedal. Throttle/brake sensor 125 may also measure an angle of a throttle body of vehicle 100, which may include part of the physical mechanism that provides modulation of energy source 119 to engine/motor 118 (e.g., a butterfly valve or carburetor). Additionally, throttle/brake sensor 125 may measure a pressure of one or more brake pads on a rotor of vehicle 100 or a combination (or a subset) of the angle of the gas pedal (throttle) and brake pedal, electrical signal representing the angle of the gas pedal (throttle) and brake pedal, the angle of the throttle body, and the pressure that at least one brake pad is applying to a rotor of vehicle 100. In other embodiments, throttle/brake sensor 125 may be configured to measure a pressure applied to a pedal of the vehicle, such as a throttle or brake pedal.

Control system 106 may include components configured to assist in navigating vehicle 100, such as steering unit 132, throttle 134, brake unit 136, sensor fusion algorithm 138, computer vision system 140, navigation/pathing system 142, and obstacle avoidance system 144. More specifically, steering unit 132 may be operable to adjust the heading of vehicle 100, and throttle 134 may control the operating speed of engine/motor 118 to control the acceleration of vehicle 100. Brake unit 136 may decelerate vehicle 100, which may involve using friction to decelerate wheels/tires 121. In some embodiments, brake unit 136 may convert kinetic energy of wheels/tires 121 to electric current for subsequent use by a system or systems of vehicle 100.

Sensor fusion algorithm 138 may include a Kalman filter, Bayesian network, or other algorithms that can process data from sensor system 104. In some embodiments, sensor fusion algorithm 138 may provide assessments based on incoming sensor data, such as evaluations of individual objects and/or features, evaluations of a particular situation, and/or evaluations of potential impacts within a given situation.

Computer vision system 140 may include hardware and software operable to process and analyze images in an effort to determine objects, environmental objects (e.g., traffic lights, roadway boundaries, etc.), and obstacles. As such, computer vision system 140 may use object recognition, Structure From Motion (SFM), video tracking, and other algorithms used in computer vision, for instance, to recognize objects, map an environment, track objects, estimate the speed of objects, etc.

Navigation/pathing system 142 may determine a driving path for vehicle 100, which may involve dynamically adjusting navigation during operation. As such, navigation/pathing system 142 may use data from sensor fusion algorithm 138, GPS 122, and maps, among other sources to navigate vehicle 100. Obstacle avoidance system 144 may evaluate potential obstacles based on sensor data and cause systems of vehicle 100 to avoid or otherwise negotiate the potential obstacles.

As shown in FIG. 1, vehicle 100 may also include peripherals 108, such as wireless communication system 146, touchscreen 148, microphone 150, and/or speaker 152. Peripherals 108 may provide controls or other elements for a user to interact with user interface 116. For example, touchscreen 148 may provide information to users of vehicle 100. User interface 116 may also accept input from the user via touchscreen 148. Peripherals 108 may also enable vehicle 100 to communicate with devices, such as other vehicle devices.

Wireless communication system 146 may wirelessly communicate with one or more devices directly or via a communication network. For example, wireless communication system 146 could use 3G cellular communication, such as code-division multiple access (CDMA), evolution-data optimized (EVDO), global system for mobile communications (GSM)/general packet radio service (GPRS), or cellular communication, such as 4G worldwide interoperability for microwave access (WiMAX) or long-term evolution (LTE), or 5G. Alternatively, wireless communication system 146 may communicate with a wireless local area network (WLAN) using WIFI® or other possible connections. Wireless communication system 146 may also communicate directly with a device using an infrared link, Bluetooth, or ZigBee, for example. Other wireless protocols, such as various vehicular communication systems, are possible within the context of the disclosure. For example, wireless communication system 146 may include one or more dedicated short-range communications (DSRC) devices that could include public and/or private data communications between vehicles and/or roadside stations.

Vehicle 100 may include power supply 110 for powering components. Power supply 110 may include a rechargeable lithium-ion or lead-acid battery in some embodiments. For instance, power supply 110 may include one or more batteries configured to provide electrical power. Vehicle 100 may also use other types of power supplies. In an example embodiment, power supply 110 and energy source 119 may be integrated into a single energy source.

Vehicle 100 may also include computer system 112 to perform operations, such as operations described therein. As such, computer system 112 may include at least one processor 113 (which could include at least one microprocessor) operable to execute instructions 115 stored in a non-transitory, computer-readable medium, such as data storage 114. In some embodiments, computer system 112 may represent a plurality of computing devices that may serve to control individual components or subsystems of vehicle 100 in a distributed fashion.

In some embodiments, data storage 114 may contain instructions 115 (e.g., program logic) executable by processor 113 to execute various functions of vehicle 100, including those described above in connection with FIG. 1. Data storage 114 may contain additional instructions as well, including instructions to transmit data to, receive data from, interact with, and/or control one or more of propulsion system 102, sensor system 104, control system 106, and peripherals 108.

In addition to instructions 115, data storage 114 may store data such as roadway maps, path information, among other information. Such information may be used by vehicle 100 and computer system 112 during the operation of vehicle 100 in the autonomous, semi-autonomous, and/or manual modes.

Vehicle 100 may include user interface 116 for providing information to or receiving input from a user of vehicle 100. User interface 116 may control or enable control of content and/or the layout of interactive images that could be displayed on touchscreen 148. Further, user interface 116 could include one or more input/output devices within the set of peripherals 108, such as wireless communication system 146, touchscreen 148, microphone 150, and speaker 152.

Computer system 112 may control the function of vehicle 100 based on inputs received from various subsystems (e.g., propulsion system 102, sensor system 104, and control system 106), as well as from user interface 116. For example, computer system 112 may utilize input from sensor system 104 in order to estimate the output produced by propulsion system 102 and control system 106. Depending upon the embodiment, computer system 112 could be operable to monitor many aspects of vehicle 100 and its subsystems. In some embodiments, computer system 112 may disable some or all functions of the vehicle 100 based on signals received from sensor system 104.

The components of vehicle 100 could be configured to work in an interconnected fashion with other components within or outside their respective systems. For instance, in an example embodiment, camera 130 could capture a plurality of images that could represent information about a state of an environment of vehicle 100 operating in an autonomous mode. The state of the environment could include parameters of the road on which the vehicle is operating. For example, computer vision system 140 may be able to recognize the slope (grade) or other features based on the plurality of images of a roadway. Additionally, the combination of GPS 122 and the features recognized by computer vision system 140 may be used with map data stored in data storage 114 to determine specific road parameters. Further, radar 126 may also provide information about the surroundings of the vehicle.

In other words, a combination of various sensors (which could be termed input-indication and output-indication sensors) and computer system 112 could interact to provide an indication of an input provided to control a vehicle or an indication of the surroundings of a vehicle.

In some embodiments, computer system 112 may make a determination about various objects based on data that is provided by systems other than the radio system. For example, vehicle 100 may have lasers or other optical sensors configured to sense objects in a field of view of the vehicle. Computer system 112 may use the outputs from the various sensors to determine information about objects in a field of view of the vehicle, and may determine distance and direction information to the various objects. Computer system 112 may also determine whether objects are desirable or undesirable based on the outputs from the various sensors.

Although FIG. 1 shows various components of vehicle 100 (i.e., wireless communication system 146, computer system 112, data storage 114, and user interface 116) as being integrated into the vehicle 100, one or more of these components could be mounted or associated separately from vehicle 100. For example, data storage 114 could, in part or in full, exist separate from vehicle 100. Thus, vehicle 100 could be provided in the form of device elements that may be located separately or together. The device elements that make up vehicle 100 could be communicatively coupled together in a wired and/or wireless fashion.

FIGS. 2A-2E shows an example vehicle 200 that can include some or all of the functions described in connection with vehicle 100 in reference to FIG. 1. Although vehicle 200 is illustrated in FIGS. 2A-2E as a van for illustrative purposes, the present disclosure is not so limited. For instance, the vehicle 200 can represent a truck, a car, a semi-trailer truck, a motorcycle, a golf cart, an off-road vehicle, a farm vehicle, etc.

The example vehicle 200 includes a sensor unit 202, a first lidar unit 204, a second lidar unit 206, a first radar unit 208, a second radar unit 210, a first lidar/radar unit 212, a second lidar/radar unit 214, and two additional locations 216, 218 at which a radar unit, lidar unit, laser rangefinder unit, and/or other type of sensor or sensor(s) could be located on the vehicle 200. Each of the first lidar/radar unit 212 and the second lidar/radar unit 214 can take the form of a lidar unit, a radar unit, or both.

Furthermore, the example vehicle 200 can include any of the components described in connection with vehicle 100 of FIG. 1. The first and second radar units 208, 210 and/or the first and second lidar units 204, 206 can actively scan the surrounding environment for the presence of potential obstacles and can be similar to the radar 126 and/or laser rangefinder/lidar 128 in the vehicle 100.

The sensor unit 202 is mounted atop the vehicle 200 and includes one or more sensors configured to detect information about an environment surrounding the vehicle 200, and output indications of the information. For example, sensor unit 202 can include any combination of cameras, radars, lidars, range finders, inertial sensors, humidity sensors, and acoustic sensors. The sensor unit 202 can include one or more movable mounts that could be operable to adjust the orientation of one or more sensors in the sensor unit 202. In one embodiment, the movable mount could include a rotating platform that could scan sensors so as to obtain information from each direction around the vehicle 200. In another embodiment, the movable mount of the sensor unit 202 could be movable in a scanning fashion within a particular range of angles and/or azimuths and/or elevations. The sensor unit 202 could be mounted atop the roof of a car, although other mounting locations are possible.

Additionally, the sensors of sensor unit 202 could be distributed in different locations and need not be collocated in a single location. Some possible sensor types and mounting locations include the two additional locations 216, 218. Furthermore, each sensor of sensor unit 202 can be configured to be moved or scanned independently of other sensors of sensor unit 202.

In an example configuration, one or more radar scanners (e.g., first and second radar units 208, 210) can be located near the rear of the vehicle 200, to actively scan the environment near the back of the vehicle 200 for the presence of radio-reflective objects. Similarly, the first lidar/radar unit 212 and the second lidar/radar unit 214 may be mounted near the front of the vehicle 200 to actively scan the environment near the front of the vehicle 200. A radar scanner can be situated, for example, in a location suitable to illuminate a region including a forward-moving path of the vehicle 200 without occlusion by other features of the vehicle 200. For example, a radar scanner can be embedded in and/or mounted in or near the front bumper, front headlights, cowl, and/or hood, etc. Furthermore, one or more additional radar scanning devices can be located to actively scan the side and/or rear of the vehicle 200 for the presence of radio-reflective objects, such as by including such devices in or near the rear bumper, side panels, rocker panels, and/or undercarriage, etc.

Although not shown in FIGS. 2A-2E, the vehicle 200 can include a wireless communication system. The wireless communication system may include wireless transmitters and receivers that could be configured to communicate with devices external or internal to the vehicle 200. Specifically, the wireless communication system could include transceivers configured to communicate with other vehicles and/or computing devices, for instance, in a vehicular communication system or a roadway station. Examples of such vehicular communication systems include DSRC, radio frequency identification (RFID), and other proposed communication standards directed towards intelligent transport systems.

The vehicle 200 can include a camera, possibly at a location inside sensor unit 202. The camera can be a photosensitive instrument, such as a still camera, a video camera, etc., that is configured to capture a plurality of images of the environment of the vehicle 200. To this end, the camera can be configured to detect visible light, and can additionally or alternatively be configured to detect light from other portions of the spectrum, such as infrared or ultraviolet light. The camera can be a two-dimensional detector, and can optionally have a three-dimensional spatial range of sensitivity. In some embodiments, the camera can include, for example, a range detector configured to generate a two-dimensional image indicating distance from the camera to a number of points in the environment. To this end, the camera may use one or more range detecting techniques. For example, the camera can provide range information by using a structured light technique in which the vehicle 200 illuminates an object in the environment with a predetermined light pattern, such as a grid or checkerboard pattern and uses the camera to detect a reflection of the predetermined light pattern from environmental surroundings. Based on distortions in the reflected light pattern, the vehicle 200 can determine the distance to the points on the object. The predetermined light pattern may comprise infrared light, or radiation at other suitable wavelengths for such measurements. In some examples, the camera can be mounted inside a front windshield of the vehicle 200. Specifically, the camera can be situated to capture images from a forward-looking view with respect to the orientation of the vehicle 200. Other mounting locations and viewing angles of camera can also be used, either inside or outside the vehicle 200. Further, the camera can have associated optics operable to provide an adjustable field of view. Still further, the camera can be mounted to vehicle 200 with a movable mount to vary a pointing angle of the camera, such as via a pan/tilt mechanism.

The vehicle 200 may include one or more other components in addition to or instead of those shown. The additional components may include electrical or mechanical functionality.

A control system of the vehicle 200 may be configured to control the vehicle 200 in accordance with a control strategy from among multiple possible control strategies. The control system may be configured to receive information from sensors coupled to the vehicle 200 (on or off the vehicle 200), modify the control strategy (and an associated driving behavior) based on the information, and control the vehicle 200 in accordance with the modified control strategy. The control system further may be configured to monitor the information received from the sensors, and continuously evaluate driving conditions; and also may be configured to modify the control strategy and driving behavior based on changes in the driving conditions.

Figure 3:
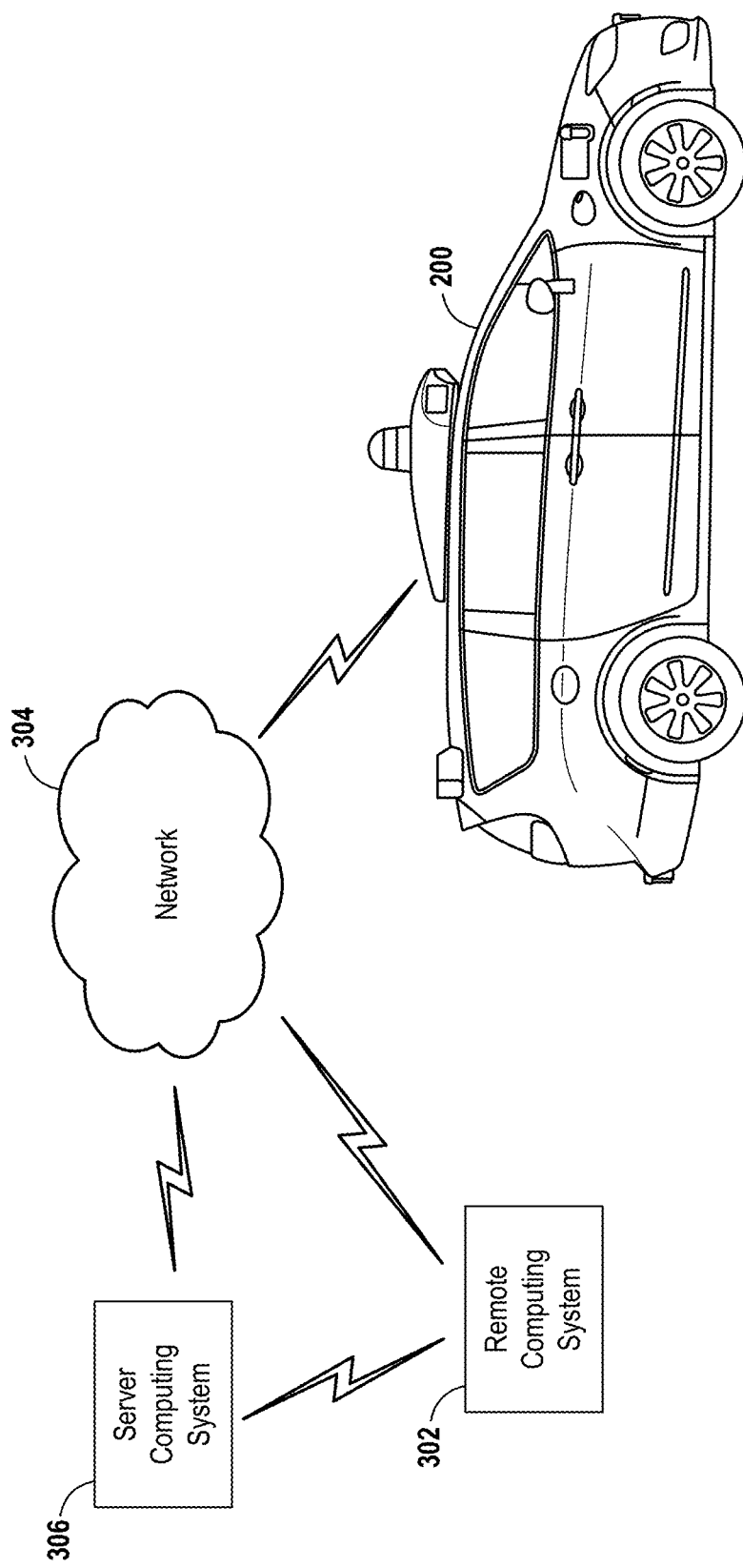
FIG. 3 is a conceptual illustration of wireless communication between various computing systems related to an autonomous vehicle, according to example embodiments.

FIG. 3 is a conceptual illustration of wireless communication between various computing systems related to an autonomous vehicle, according to example embodiments. In particular, wireless communication may occur between remote computing system 302 and vehicle 200 via network 304. Wireless communication may also occur between server computing system 306 and remote computing system 302, and between server computing system 306 and vehicle 200.

Vehicle 200 can correspond to various types of vehicles capable of transporting passengers or objects between locations, and may take the form of any one or more of the vehicles discussed above. In some instances, vehicle 200 may operate in an autonomous mode that enables a control system to safely navigate vehicle 200 between destinations using sensor measurements. When operating in an autonomous mode, vehicle 200 may navigate with or without passengers. As a result, vehicle 200 may pick up and drop off passengers between desired destinations.

Remote computing system 302 may represent any type of device related to remote assistance techniques, including but not limited to those described herein. Within examples, remote computing system 302 may represent any type of device configured to (i) receive information related to vehicle 200, (ii) provide an interface through which a human operator can in turn perceive the information and input a response related to the information, and (iii) transmit the response to vehicle 200 or to other devices. Remote computing system 302 may take various forms, such as a workstation, a desktop computer, a laptop, a tablet, a mobile phone (e.g., a smart phone), and/or a server. In some examples, remote computing system 302 may include multiple computing devices operating together in a network configuration.

Remote computing system 302 may include one or more subsystems and components similar or identical to the subsystems and components of vehicle 200. At a minimum, remote computing system 302 may include a processor configured for performing various operations described herein. In some embodiments, remote computing system 302 may also include a user interface that includes input/output devices, such as a touchscreen and a speaker. Other examples are possible as well.

Network 304 represents infrastructure that enables wireless communication between remote computing system 302 and vehicle 200. Network 304 also enables wireless communication between server computing system 306 and remote computing system 302, and between server computing system 306 and vehicle 200.

The position of remote computing system 302 can vary within examples. For instance, remote computing system 302 may have a remote position from vehicle 200 that has a wireless communication via network 304. In another example, remote computing system 302 may correspond to a computing device within vehicle 200 that is separate from vehicle 200, but with which a human operator can interact while a passenger or driver of vehicle 200. In some examples, remote computing system 302 may be a computing device with a touchscreen operable by the passenger of vehicle 200.

In some embodiments, operations described herein that are performed by remote computing system 302 may be additionally or alternatively performed by vehicle 200 (i.e., by any system(s) or subsystem(s) of vehicle 200). In other words, vehicle 200 may be configured to provide a remote assistance mechanism with which a driver or passenger of the vehicle can interact.

Server computing system 306 may be configured to wirelessly communicate with remote computing system 302 and vehicle 200 via network 304 (or perhaps directly with remote computing system 302 and/or vehicle 200). Server computing system 306 may represent any computing device configured to receive, store, determine, and/or send information relating to vehicle 200 and the remote assistance thereof. As such, server computing system 306 may be configured to perform any operation(s), or portions of such operation(s), that is/are described herein as performed by remote computing system 302 and/or vehicle 200. Some embodiments of wireless communication related to remote assistance may utilize server computing system 306, while others may not.

Server computing system 306 may include one or more subsystems and components similar or identical to the subsystems and components of remote computing system 302 and/or vehicle 200, such as a processor configured for performing various operations described herein, and a wireless communication interface for receiving information from, and providing information to, remote computing system 302 and vehicle 200.

The various systems described above may perform various operations. These operations and related features will now be described.

In line with the discussion above, a computing system (e.g., remote computing system 302, server computing system 306, or a computing system local to vehicle 200) may operate to use a camera to capture images of the environment of an autonomous vehicle. In general, at least one computing system will be able to analyze the images and possibly control the autonomous vehicle.

In some embodiments, to facilitate autonomous operation a vehicle (e.g., vehicle 200) may receive data representing objects in an environment in which the vehicle operates (also referred to herein as "environment data") in a variety of ways. A sensor system on the vehicle may provide the environment data representing objects of the environment. For example, the vehicle may have various sensors, including a camera, a radar unit, a laser range finder, a microphone, a radio unit, and other sensors. Each of these sensors may communicate environment data to a processor in the vehicle about information each respective sensor receives.

In one example, a camera may be configured to capture still images and/or video. In some embodiments, the vehicle may have more than one camera positioned in different orientations. Also, in some embodiments, the camera may be able to move to capture images and/or video in different directions. The camera may be configured to store captured images and video to a memory for later processing by a processing system of the vehicle. The captured images and/or video may be the environment data. Further, the camera may include an image sensor as described herein.

In another example, a radar unit may be configured to transmit an electromagnetic signal that will be reflected by various objects near the vehicle, and then capture electromagnetic signals that reflect off the objects. The captured reflected electromagnetic signals may enable the radar system (or processing system) to make various determinations about objects that reflected the electromagnetic signal. For example, the distances to and positions of various reflecting objects may be determined. In some embodiments, the vehicle may have more than one radar in different orientations. The radar system may be configured to store captured information to a memory for later processing by a processing system of the vehicle. The information captured by the radar system may be environment data.

In another example, a laser range finder may be configured to transmit an electromagnetic signal (e.g., infrared light, such as that from a gas or diode laser, or other possible light source) that will be reflected by target objects near the vehicle. The laser range finder may be able to capture the reflected electromagnetic (e.g., laser) signals. The captured reflected electromagnetic signals may enable the range-finding system (or processing system) to determine a range to various objects. The laser range finder may also be able to determine a velocity or speed of target objects and store it as environment data.

Additionally, in an example, a microphone may be configured to capture audio of the environment surrounding the vehicle. Sounds captured by the microphone may include emergency vehicle sirens and the sounds of other vehicles. For example, the microphone may capture the sound of the siren of an ambulance, fire engine, or police vehicle. A processing system may be able to identify that the captured audio signal is indicative of an emergency vehicle. In another example, the microphone may capture the sound of an exhaust of another vehicle, such as that from a motorcycle. A processing system may be able to identify that the captured audio signal is indicative of a motorcycle. The data captured by the microphone may form a portion of the environment data.

In yet another example, the radio unit may be configured to transmit an electromagnetic signal that may take the form of a Bluetooth signal, 802.11 signal, and/or other radio technology signal. The first electromagnetic radiation signal may be transmitted via one or more antennas located in a radio unit. Further, the first electromagnetic radiation signal may be transmitted with one of many different radio-signaling modes. However, in some embodiments it is desirable to transmit the first electromagnetic radiation signal with a signaling mode that requests a response from devices located near the autonomous vehicle. The processing system may be able to detect nearby devices based on the responses communicated back to the radio unit and use this communicated information as a portion of the environment data.

In some embodiments, the processing system may be able to combine information from the various sensors in order to make further determinations of the environment of the vehicle. For example, the processing system may combine data from both radar information and a captured image to determine if another vehicle or pedestrian is in front of the autonomous vehicle. In other embodiments, other combinations of sensor data may be used by the processing system to make determinations about the environment.

While operating in an autonomous mode, the vehicle may control its operation with little-to-no human input. For example, a human-operator may enter an address into the vehicle and the vehicle may then be able to drive, without further input from the human (e.g., the human does not have to steer or touch the brake/gas pedals), to the specified destination. Further, while the vehicle is operating autonomously, the sensor system may be receiving environment data. The processing system of the vehicle may alter the control of the vehicle based on environment data received from the various sensors. In some examples, the vehicle may alter a velocity of the vehicle in response to environment data from the various sensors. The vehicle may change velocity in order to avoid obstacles, obey traffic laws, etc. When a processing system in the vehicle identifies objects near the vehicle, the vehicle may be able to change velocity, or alter the movement in another way.

When the vehicle detects an object but is not highly confident in the detection of the object, the vehicle can request a human operator (or a more powerful computer) to perform one or more remote assistance tasks, such as (i) confirm whether the object is in fact present in the environment (e.g., if there is actually a stop sign or if there is actually no stop sign present), (ii) confirm whether the vehicle's identification of the object is correct, (iii) correct the identification if the identification was incorrect and/or (iv) provide a supplemental instruction (or modify a present instruction) for the autonomous vehicle. Remote assistance tasks may also include the human operator providing an instruction to control operation of the vehicle (e.g., instruct the vehicle to stop at a stop sign if the human operator determines that the object is a stop sign), although in some scenarios, the vehicle itself may control its own operation based on the human operator's feedback related to the identification of the object.

To facilitate this, the vehicle may analyze the environment data representing objects of the environment to determine at least one object having a detection confidence below a threshold. A processor in the vehicle may be configured to detect various objects of the environment based on environment data from various sensors. For example, in one embodiment, the processor may be configured to detect objects that may be important for the vehicle to recognize. Such objects may include pedestrians, street signs, other vehicles, indicator signals on other vehicles, and other various objects detected in the captured environment data.

The detection confidence may be indicative of a likelihood that the determined object is correctly identified in the environment, or is present in the environment. For example, the processor may perform object detection of objects within image data in the received environment data, and determine that the at least one object has the detection confidence below the threshold based on being unable to identify the object with a detection confidence above the threshold. If a result of an object detection or object recognition of the object is inconclusive, then the detection confidence may be low or below the set threshold.

The vehicle may detect objects of the environment in various ways depending on the source of the environment data. In some embodiments, the environment data may come from a camera and be image or video data. In other embodiments, the environment data may come from a lidar unit. The vehicle may analyze the captured image or video data to identify objects in the image or video data. The methods and apparatuses may be configured to monitor image and/or video data for the presence of objects of the environment. In other embodiments, the environment data may be radar, audio, or other data. The vehicle may be configured to identify objects of the environment based on the radar, audio, or other data.

In some embodiments, the techniques the vehicle uses to detect objects may be based on a set of known data. For example, data related to environmental objects may be stored to a memory located in the vehicle. The vehicle may compare received data to the stored data to determine objects. In other embodiments, the vehicle may be configured to determine objects based on the context of the data. For example, street signs related to construction may generally have an orange color. Accordingly, the vehicle may be configured to detect objects that are orange, and located near the side of roadways as construction-related street signs.

Additionally, when the processing system of the vehicle detects objects in the captured data, it also may calculate a confidence for each object.

Further, the vehicle may also have a confidence threshold. The confidence threshold may vary depending on the type of object being detected. For example, the confidence threshold may be lower for an object that may require a quick responsive action from the vehicle, such as brake lights on another vehicle. However, in other embodiments, the confidence threshold may be the same for all detected objects. When the confidence associated with a detected object is greater than the confidence threshold, the vehicle may assume the object was correctly recognized and responsively adjust the control of the vehicle based on that assumption.

When the confidence associated with a detected object is less than the confidence threshold, the actions that the vehicle takes may vary. In some embodiments, the vehicle may react as if the detected object is present despite the low confidence level. In other embodiments, the vehicle may react as if the detected object is not present.

When the vehicle detects an object of the environment, it may also calculate a confidence associated with the specific detected object. The confidence may be calculated in various ways depending on the embodiment. In one example, when detecting objects of the environment, the vehicle may compare environment data to predetermined data relating to known objects. The closer the match between the environment data and the predetermined data, the higher the confidence. In other embodiments, the vehicle may use mathematical analysis of the environment data to determine the confidence associated with the objects.

In response to determining that an object has a detection confidence that is below the threshold, the vehicle may transmit, to the remote computing system, a request for remote assistance with the identification of the object. As discussed above, the remote computing system may take various forms. For example, the remote computing system may be a computing device within the vehicle that is separate from the vehicle, but with which a human operator can interact while a passenger or driver of the vehicle, such as a touchscreen interface for displaying remote assistance information. Additionally or alternatively, as another example, the remote computing system may be a remote computer terminal or other device that is located at a location that is not near the vehicle.

The request for remote assistance may include the environment data that includes the object, such as image data, audio data, etc. The vehicle may transmit the environment data to the remote computing system over a network (e.g., network 304), and in some embodiments, via a server (e.g., server computing system 306). The human operator of the remote computing system may in turn use the environment data as a basis for responding to the request.

In some embodiments, when the object is detected as having a confidence below the confidence threshold, the object may be given a preliminary identification, and the vehicle may be configured to adjust the operation of the vehicle in response to the preliminary identification. Such an adjustment of operation may take the form of stopping the vehicle, switching the vehicle to a human-controlled mode, changing a velocity of vehicle (e.g., a speed and/or direction), among other possible adjustments.

In other embodiments, even if the vehicle detects an object having a confidence that meets or exceeds the threshold, the vehicle may operate in accordance with the detected object (e.g., come to a stop if the object is identified with high confidence as a stop sign), but may be configured to request remote assistance at the same time as (or at a later time from) when the vehicle operates in accordance with the detected object.

Figure 4:
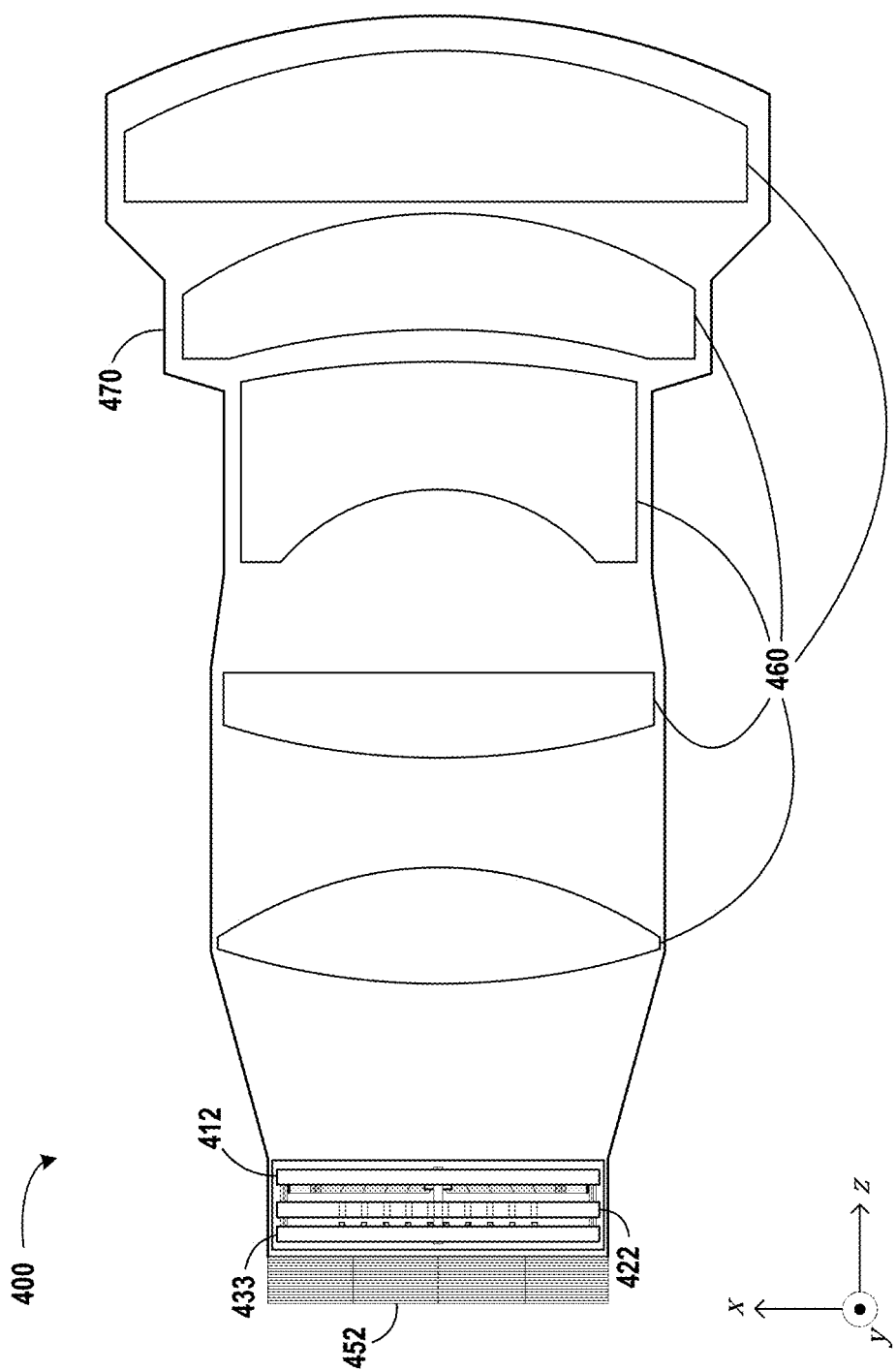
FIG. 4 is an illustration of a lidar device, according to example embodiments.

FIG. 4 is an illustration of a lidar device 400, according to example embodiments. In some embodiments, the lidar device 400 may be a component of an autonomous vehicle and may be usable for object detection and avoidance. The lidar device 400 may include a substrate 412, an aperture plate 422, a detector substrate 433, a cooling component 452, and a shared telecentric lens assembly 460. Further, the lidar device 400 may include a casing 470 configured to maintain the components of the lidar device 400 relative to one another in the proper position and/or orientation once mounted in the casing 470 (e.g., the casing 470 may be transparent to light signals emitted by the light emitters of the lidar device 400). The substrate 412, the aperture plate 422, and the detector substrate 433 will be shown and described below with reference to FIGS. 5A-5D.

The cooling component 452 may cool one or more of the components of the lidar device 400. For example, the cooling component 452 may cool one or more controllers (e.g., including processors) of the lidar device 400. Additionally or alternatively, the cooling component 452 may cool one or more light emitters of the lidar device 400, one or more firing circuits associated with the light emitters of the lidar device 400, and/or one or more light detectors of the lidar device 400. In some embodiments, the cooling component 452 may include one or more passive cooling devices (e.g., a heatsink). In other embodiments, the cooling component 452 may include one or more active cooling devices (e.g., a fan or a liquid-cooling device).

The shared telecentric lens assembly 460 may be shared between both the transmit channels and the receive channels within the lidar device 400. For example, the shared telecentric lens assembly 460 may receive transmitted light signals from light-guide manifolds on the substrate 412 and emit those light signals toward an environment surrounding the lidar device. Likewise, the shared telecentric lens assembly 460 may receive light signals reflected from objects in the environment surrounding the lidar device 400. Such received light signals may be transmitted through apertures in the aperture plate 422 to an array of light detectors on the detector substrate 433. In alternate embodiments, the transmit channels may use a different lens assembly than the receive channels.

Because the shared telecentric lens assembly 460 is telecentrically designed, visualizations of the surrounding scene (e.g., a point cloud) generated using the lidar device 400 may be orthographic. As such, sizes and shapes of objects in the surrounding environment can be precisely determined using the lidar device 400 independent of the position of the objects within a field of view of the lidar device 400.

The shared telecentric lens assembly 460 may include a series of cascaded lens elements, as illustrated in FIG. 4. While five cascaded lenses are illustrated in FIG. 4, it is understood that other numbers of lenses could additionally or alternatively be used (e.g., one lens, two lenses, three lenses, four lenses, six lenses, seven lenses, eight lenses, nine lenses, ten lenses, etc.). Regardless of the number of lenses included in the telecentric lens assembly 460, the cascaded lenses may be separated into one or more groups. For example, the shared telecentric lens assembly 460 illustrated in FIG. 4 may include three groups of lenses.

The first group of lenses may have a positive focal length and positive power. The first group of lenses may introduce positive spherical aberration and positive field curvature. Further, lens elements in the first group may be constructed from materials having high indices of refraction (e.g., n>1.6) to minimize the accumulated spherical aberrations. Additionally or alternatively, the first group of lenses may include two or more distinct lens elements to further minimize the spherical aberrations (e.g., two lenses with positive power may have less spherical aberration than a single lens with an equivalent positive power). In other embodiments, the first group may include a single lens element.

The second group of lenses (e.g., located between the first group of lenses and the third group of lenses) may have a negative power. This second group may compensate for the spherical aberration and/or field curvature introduced into the signals by the first group of lenses. In some embodiments, the second group of lenses may also include two or more distinct lens elements. In other embodiments, the second group may include a single lens element. Additionally, lens elements in the second group may be constructed from materials having lower indices of refraction than lens elements in the first group (e.g., n<1.6, so as to more greatly reduce the amount of spherical aberration and field curvature). The negative power of the second group of lenses may be lower in magnitude than the positive power of the first group of lenses. As such, the second group of lenses may compensate for the aberrations generated by the first group of lenses while maintaining a positive overall power (e.g., and positive effective focal length) between the first and second groups.

The third group of lenses may have positive power (e.g., like the first group of lenses). In some embodiments, the third group may include a single lens element. In other embodiments, the third group of lenses may include two or more lens elements. The focal length of the third group of lenses may be selected based on the first and second groups of lenses so that the combination of lenses in the shared telecentric lens assembly 460 is telecentric. In addition, lens elements in the third group may be constructed from materials having high indices of refraction (e.g., n>1.6) to reduce spherical aberrations.

The use of materials with the indices of refraction as recited above may reduce spherical aberrations. In traditional, multiwavelength imaging systems, though, such indices of refraction may lead to undesirable chromatic aberration (e.g., because glasses with higher refractive indices tend to have greater wavelength-dependency with respect to refractive index, i.e., experience higher optical dispersion). However, if the lidar device 400 includes light emitters that emit light across a narrow band of wavelengths, such chromatic aberration can be mitigated, allowing for enhanced image quality even with a limited number of lens elements in the shared telecentric lens assembly 460 without adverse chromatic aberration effects.

Figure 5A:
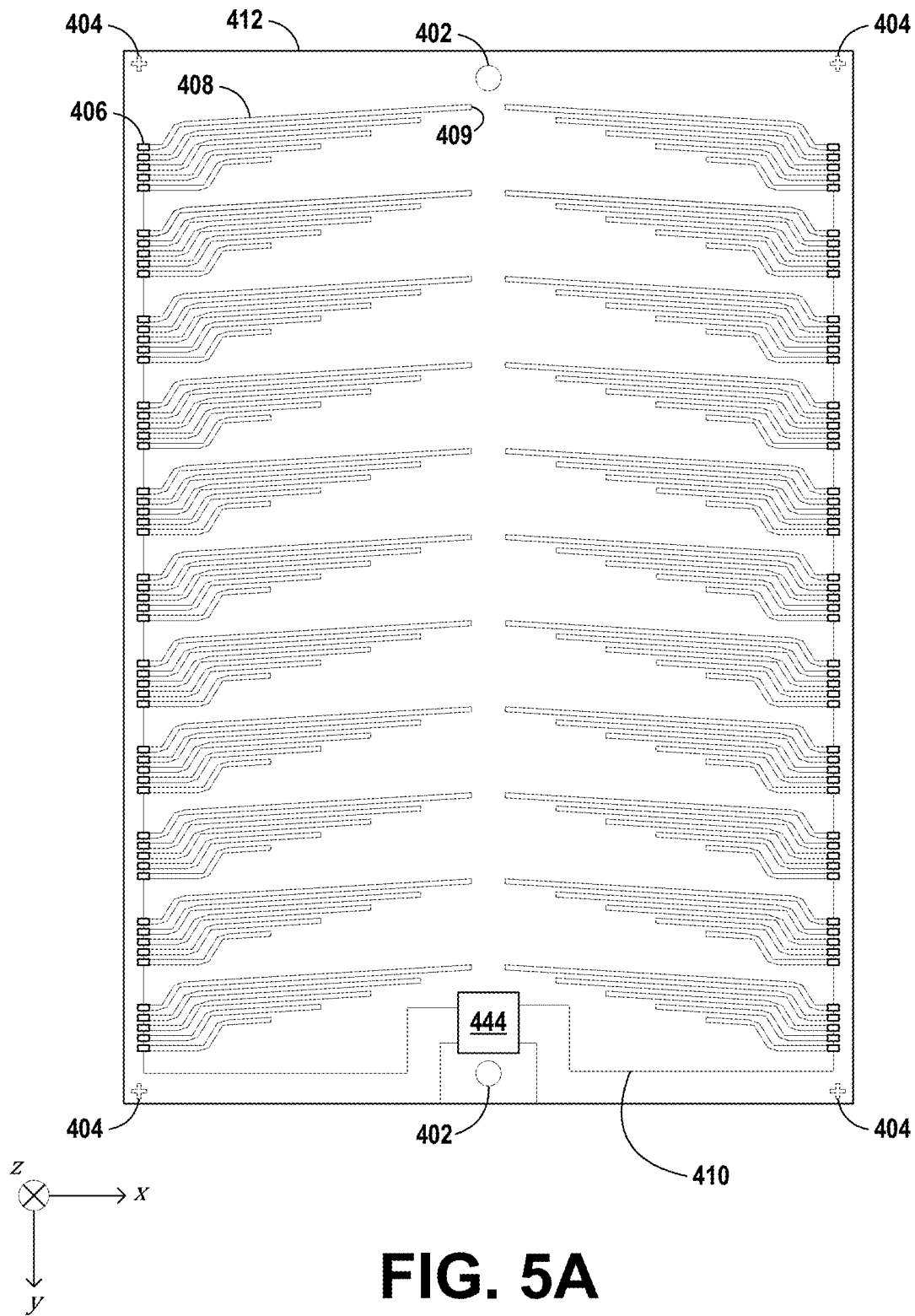
FIG. 5A is an illustration of a substrate, according to example embodiments.

FIG. 5A is an illustration of a substrate of a lidar device (e.g., the substrate 412 of the lidar device 400 illustrated in FIG. 4). The substrate 412 may include one or more mounting holes 402, one or more alignment marks 404, an array of light emitters 406, an array of light-guide manifolds 408, conductive traces 410, and a firing circuit 444.

The mounting holes 402 may be used to attach the substrate 412 to other components of the lidar device 400. For example, the mounting holes 402 may be through-holes by which the aperture plate 422 is attached to the substrate 412. In some embodiments, the mounting holes 402 may be threaded such that a bolt or screw can be used to affix the substrate 412 to other components. In some embodiments, the substrate 412 may be attached to other components of the lidar device 400 using a pin, snap, and/or clamp (e.g., with or without mounting holes 402 defined within the substrate 412). In some embodiments, the mounting holes 402 may be used to align one or more components of the lidar device 400. For example, the mounting holes 402 may have a reference pin inserted therethrough to ensure that the light emitters 406 are aligned with their respective light detectors 434. Even further, in addition to the reference pin for alignment, a compression spring (not illustrated) may be used to attach the aperture plate 422 to the substrate 412 and/or the detector substrate 433 to the substrate 412.

In some embodiments, the alignment mark(s) 404 may be used to align the substrate 412 with other components to which the substrate 412 is attached (e.g., in addition to or instead of the mounting holes 402 being used for alignment). For example, the alignment mark(s) 404 can properly position the substrate 412 relative to the aperture plate 422 and/or the detector substrate 433 such that transmitted and received light signals can properly pass through the apertures in the aperture plate 422 and reach the light detectors on the detector substrate 433. As illustrated, the alignment marks 404 may be positioned near the four corners of the substrate 412. While four alignment marks 404 are illustrated in FIG. 5A, it is understood and contemplated herein that other numbers of alignment marks are also possible in alternate embodiments (e.g., zero, one, two, three, five, six, seven, eight, nine, ten, etc.). Further, it is understood and contemplated herein that other shapes, sizes, and positions of any alignment mark(s) are also possible. Additionally or alternatively, the alignment marks of the substrate may have non-uniform shape and/or size (e.g., one alignment mark may be bigger than another alignment mark and/or have a different shape than another alignment mark).

The light emitters 406 in the array may include light sources such as laser diodes. In some embodiments, the light emitters 406 may include pulsed light sources. For example, the light sources may include one or more pulsed lasers (e.g., a Q-switched laser). In alternate embodiments, a continuous wave (CW) light source may be used. In some embodiments, the light emitters 406 may include a fiber laser coupled to an optical amplifier. In particular, the fiber laser may be a laser in which an active gain medium (i.e., source of optical gain within the laser) is in an optical fiber. Moreover, the fiber laser could be arranged in various ways within lidar device 400 (e.g., partially disposed on the substrate 412 or entirely disposed on the substrate 412). In still other embodiments, however, one or more light emitters 406 in the array may additionally or alternatively include light emitting diodes (LEDs), vertical cavity surface emitting lasers (VCSELs), organic light emitting diodes (OLEDs), polymer light emitting diodes (PLEDs), light emitting polymers (LEPs), liquid crystal displays (LCDs), microelectromechanical systems (MEMS), and/or any other device configured to selectively transmit, reflect, and/or emit light to provide emitted light beams and/or pulses. The light emitters 406 may be configured to emit light signals toward objects in a surrounding environment that, when reflected by such objects, can be detected by detectors to determine a distance between the lidar device 400 and the respective object.

The wavelength range emitted by the light emitters 406 could, for example, be in the ultraviolet, visible, and/or infrared portions of the electromagnetic spectrum. In some examples, the wavelength range can be a narrow wavelength range, such as is provided by lasers. In some embodiments, the wavelength range includes wavelengths that are approximately 905 nm. It is noted that this wavelength is provided only as an example and is not meant to be limiting.

Light signals (e.g., light pulses) emitted by the light emitters 406 in the array may be coupled into a corresponding array of light-guide manifolds 408. Additionally or alternatively, light signals emitted by the light emitters 406 may be redirected, focused, collimated, filtered, and/or otherwise adjusted prior to being coupled into the light-guide manifolds 408. In some embodiments, coupling the light signals may include directly abutting the light-guide manifolds 408 to the emission surface of the light emitters 406. Alternatively, coupling light from the light emitters 406 into the light-guide manifolds 408 may be accomplished by coupling optics between the light emitters 406 and the light-guide manifolds 408. For example, one or more Bragg gratings may be positioned between the light emitters 406 and the light-guide manifolds 408. In other embodiments, an array of astigmatic lenses may be used to couple light signals from the array of light emitters 406 into the corresponding array of light-guide manifolds 408. For example, an astigmatic lens (e.g., a cylindrical lens) may be positioned between each light emitter 406 and each corresponding light-guide manifold 408. Alternatively, two astigmatic lenses (e.g., cylindrical lenses) may be used to couple light signals into the light-guide manifolds 408. For example, a first cylindrical lens may span the entire length of the substrate 412 on the left side in between each of the light emitters 406 on the left side of the substrate 412 and the light-guide manifolds 408 on the left side of the substrate 412. Hence, the first cylindrical lens may couple light signals from each of the light emitters 406 on the left side of the substrate 412 into the corresponding light-guide manifolds 408 on the left side of the substrate 412. Similarly, a second cylindrical lens may span the entire length of the substrate 412 on the right side in between each of the light emitters 406 on the right side of the substrate 412 and the light-guide manifolds 408 on the right side of the substrate 412. Likewise, the second cylindrical lens may couple light signals from each of the light emitters 406 on the right side of the substrate 412 into the corresponding light-guide manifolds 408 on the right side of the substrate 412. Other light coupling structures are possible and contemplated herein.

The light-guide manifolds 408 may receive light signals emitted by the light emitters 406. After receiving light signals from the light emitters 406, the light-guide manifolds 408 may each propagate the respective light signal from one end of the respective light-guide manifold 408 to the other end. In some embodiments, the light-guide manifolds 408 may include optical waveguides. Such optical waveguides may be fabricated from materials (e.g., photoresist, epoxy, etc.) that have higher refractive indices than the surrounding medium (e.g., air, vacuum, etc.) within the lidar device 400. Thus, the light signals may propagate from one end of the light-guide manifold 408 to the other by total internal reflection. In other words, when the light signal interacts with the interface between the light-guide manifold 408 and the surrounding medium, the light signal may be reflected internally so long as the angle of incidence is less than the critical angle (e.g., which may be based on a ratio of the respective indices of refraction of the light-guide manifold 408 compared to the surrounding medium).

Based on the propagation described above, at least a portion of the light signal coupled into a first end of the light-guide manifold 408 may reach an opposite, output end of the light-guide manifold 408. A mirror 409 may be located at the output end of each of the light-guide manifolds 408. The mirrors 409 may comprise a reflective material on angled portions of the respective optical waveguides (e.g., at an angle between 30° and 60°, such as 45°). Based on the angle, a portion of the respective light signal may be directed in the negative z-direction (e.g., into the page, as illustrated in FIG. 5A). The light signal may then pass through the shared telecentric lens assembly 460 and out of the lidar device 400 to the surrounding environment. The ends of the light-guide manifolds 408 may be positioned relative to the shared telecentric lens assembly 460 such that the emitted light signals are transmitted into the surrounding environment across a range of azimuthal angles and/or elevation angles (e.g., to interrogate a corresponding range of angles within the surrounding environment). For example, based on the array of (x,y) positions of the light emitters 406 on the substrate 412 (e.g., as illustrated in FIG. 5A), each light signal transmitted from the light-guide manifold 408 to the shared telecentric lens assembly 460 (e.g., through the aperture plate 422) may intercept a different location on the shared telecentric lens assembly 460. Because of this and the shape of the shared telecentric lens assembly 460, the light signals may be spread across a range of azimuthal angles and/or elevation angles.

In some embodiments, the substrate 412 may be partially or wholly transparent and/or partially or wholly translucent below the output ends of the light-guide manifolds 408. This may allow light signals being transmitted to or returning from the environment (e.g., and directed through the shared telecentric lens assembly 460 and the apertures 432 in the aperture plate 422) to pass through and/or around the output ends of the light-guide manifolds 408 and the substrate 412 and be directed to the surrounding environment (on the transmit side) or detected by the array of light detectors 434 (on the receive side) (e.g., as shown and described with reference to FIGS. 5B and 5D). In other embodiments, the substrate 412 may have holes defined therein below the output ends of the light-guide manifolds 408, again allowing light signals being transmitted to or returning from the environment to pass through and/or around the output ends of the light-guide manifolds 408 and the substrate 412 and to be directed to the surrounding environment (on the transmit side) or detected by the array of light detectors 434 (on the receive side).

In alternate embodiments, the mirrors 409 may include one or more alternate mirrors (e.g., aluminum-glass mirror or silver-glass mirror) positioned at the end of the light-guide manifold 408. Such alternate mirrors may also be positioned at an angle relative to the propagation direction of the light signals within the light-guide manifolds 408 so as to direct the light signals out of the light-guide manifolds 408 and toward the surrounding environment.

It is understood that the light-guide manifolds 408 could take different shapes than those illustrated in FIG. 5A (which is provided solely as an example). For example, some light-guide manifolds 408 could have the s-shape as illustrated, while others are straight lines or other curves (e.g., arcs). Any shape of the light-guide manifolds is possible, so long as at least a portion of the light signal emitted by the respective light emitter 406 can propagate through the light-guide manifold 408 and, ultimately, out of the lidar device 400. Further, some embodiments could include different numbers of light-guide manifolds 408 and/or light emitters 406 than is illustrated in FIG. 5A.

It is also understood that the light-guide manifolds 408 could include components in addition to or instead of optical waveguides. For example, the light-guide manifolds 408 may include a series of mirrors to direct the light signals from the light emitters 406 to the telecentric lens assembly 460. Further, in some embodiments, the light-guide manifolds 408 could additionally or alternatively be used in the receive channels (e.g., to propagate light signals that were reflected from the scene and received by the lidar device to one or more light detectors).

In some embodiments, the light-guide manifolds 408 may be separated by sufficient distance on the substrate 412 so as to prevent cross-talk (e.g., to prevent cross-coupling of light signals between adjacent optical waveguides). Additionally or alternatively, in some embodiments, one or more baffles may be positioned between the light-guide manifolds 408. The baffles may be opaque to one or more wavelengths of the light signals emitted by the light emitters 406. Such baffles may prevent cross-talk between channels (e.g., on both the transmit side and the receive side).

The array of light emitters 406 may be powered by and/or controlled by the firing circuit 444. As illustrated, the firing circuit 444 may be connected to one or more of the light emitters 406 by conductive traces 410 defined in the substrate 412. FIG. 5A illustrates a first conductive trace 410 connecting the firing circuit 444 to the light emitters 406 on the left side of the substrate 412 and a second conductive trace 410 connecting the firing circuit 444 to the light emitters 406 on the right side of the substrate 412. It is understood that this is provided solely as an example. In other embodiments, the firing circuit 444 may be connected individually to each of the light emitters 406 by a separate conductive trace. Alternatively, the firing circuit 444 may be connected to banks of light emitters 406 by a conductive trace. For example, groups of five light emitters 406 may be connected to the firing circuit 444 by a conductive trace. In this way, banks of five light emitters 406 could be fired simultaneously by the firing circuit 444. Other numbers of light emitters 406 within a group are also possible.

In some embodiments, the firing circuit 444 may include one or more capacitors. Such capacitors may be charged by one or more power supplies. Then, to cause the light emitters 406 to emit light signals (i.e., to "fire"), the stored energy in the capacitors may be discharged through the light emitters 406. In some embodiments, the firing circuit 444 may cause the light emitters 406 to emit light signals simultaneously with one another. In other embodiments, the firing circuit 444 may cause the light emitters 406 to emit light signals sequentially.

Figure 5B:
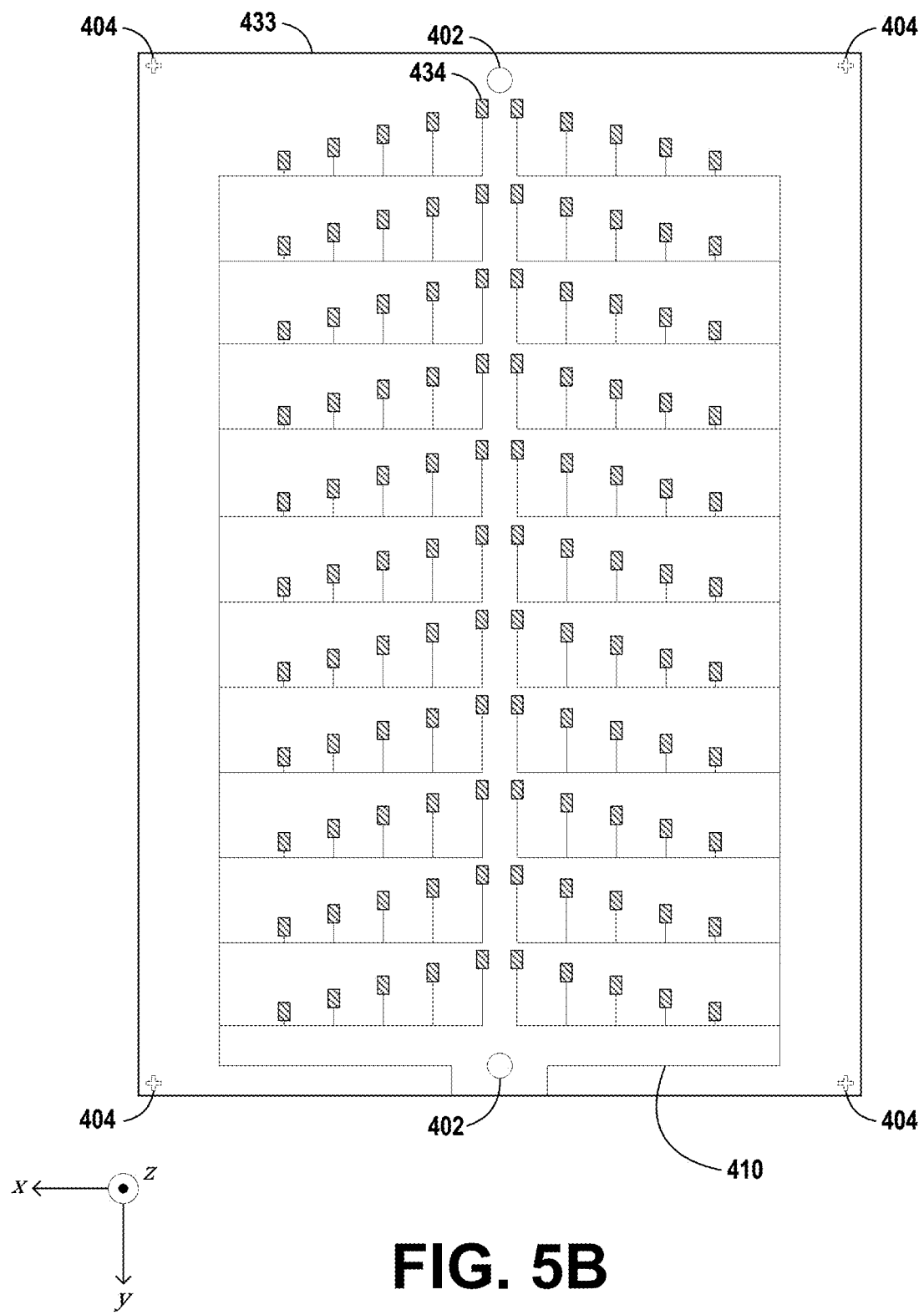
FIG. 5B is an illustration of a substrate, according to example embodiments.

Other firing patterns (including random and pseudo-random firing patterns) are also possible and contemplated herein. For example, as illustrated in FIG. 5A, the array of light emitters 406 may be divided into sub-arrays of light emitters (e.g., a first sub-array that corresponds to the light emitters 406 on the left side of the substrate 412 and a second sub-array that corresponds to the light emitters 406 on the right side of the substrate 412). The sub-arrays of light emitters 406 may be independently powered from one another. As such, the first sub-array of light emitters 406 and the second sub-array of light emitters 406 may be configured to be fired at different times from one another (e.g., the second sub-array of light emitters 406 may be fired at a delay with respect to a firing of the first sub-array of light emitters 406, or vice versa). The first and second sub-arrays of light emitters 406 may correspond to first and second sub-arrays of light detectors 434 (e.g., on a backside of the substrate 412, as illustrated in FIG. 5B). The first and second sub-arrays of light detectors 434 may also be independently powered from one another. Based on the difference in firing times between the first sub-array of light emitters 406 and the second sub-array of light emitters 406, the signal detections using the first sub-array of light detectors 434 and the second sub-array of light detectors 434 may also be staggered in time.

Additionally, in some embodiments, the firing circuit 444 may be controlled by a controller (e.g., a microprocessor configured to execute instructions stored on a non-transitory, computer-readable medium). The controller may selectively fire the light emitters 406 using the firing circuit 444 via firing-control signals (e.g., according to a predefined pattern). In some embodiments, the controller may also be configured to control other functions of the lidar device 400. For example, the controller may control the movement of one or more movable stages associated with the lidar device 400 and/or generate a point-cloud representation of the environment surrounding the lidar device 400 based on received electronic signals from light detectors 434 in the lidar device 400 that correspond to detected light signals reflected from objects in the environment. Generating the point-cloud representation may be done based on the intensity of the detected signal compared to the intensity of an emitted signal and/or based on the timing of the detected signal compared to the timing of an emitted signal, in various embodiments. In alternate embodiments, data about detected light signals and/or emitted light signals (e.g., timing data or intensity data) may be transmitted to a separate computing device (e.g., a remotely located server computing device or an on-board vehicle controller). The separate computing device may be configured to generate the point-cloud representation (e.g., and store the point-cloud representation in a memory and/or transmit the point-cloud representation to a lidar controller).

FIG. 5B is an illustration of a detector substrate 433, according to example embodiments. For example, the detector substrate 433 may have an array of light detectors 434 defined thereon. Similar to the substrate 412 illustrated in FIG. 5A, the detector substrate 433 may include one or more mounting holes 402. Similar to the light emitters 406 illustrated in FIG. 5A, one or more conductive traces 410 may run to each of the light detectors 434.

The conductive traces 410 may be connected to a controller (e.g., a controller within the firing circuit 444, as illustrated in FIG. 5A). The controller may receive electric signals from the light detectors 434 corresponding to detection events within the light detectors 434. Further, the controller may use such electric signals to determine information about objects in an environment surrounding the lidar device 400. For example, the controller may determine the range to one or more objects in the surrounding environment and/or the reflectivities of one or more objects in the surrounding environment based on the electric signals. As illustrated, the conductive traces 410 may be connected to multiple light detectors 434. As such, electric signals from each of the light detectors 434 may include identifying information (e.g., a header code) to identify from which light detector 434 the electric signal originated. Additionally or alternatively, the light detectors 434 may be configured to send electric signals along the same conductive trace 410 according to a certain timing scheme so that electric signals can be matched up by a controller with the light detector 434 from which the signal originated. In alternate embodiments, each conductive trace 410 may only be connected to a single light detector 434 (e.g., a single conductive trace may run between a controller and a single light detector 434). In such embodiments, multiplexing of electric signals may not be used.

The light detectors 434 may include various types of detectors (e.g., single-photon detectors). For example, the light detectors 434 may include SPADs and/or SiPMs. SPADs may employ avalanche breakdown within a reverse biased p-n junction (i.e., diode) to increase an output current for a given incident illumination on the SPAD. Further, SPADs may be able to generate multiple electron-hole pairs for a single incident photon. Additionally or alternatively, the light detectors 434 may include APDs. In some embodiments, the light detectors 434 may be biased above an avalanche breakdown voltage. Such a biasing condition may create a positive feedback loop having a loop gain that is greater than one. In addition, SPADs biased above the threshold avalanche breakdown voltage may be single-photon sensitive. In other examples, the light detectors 434 may include photoresistors, charge-coupled devices (CCDs), photovoltaic cells, and/or any other type of light detector.

In some implementations, the array of light detectors 434 may include more than one type of light detector across the array. For example, the array of light detectors 434 can be configured to detect multiple predefined wavelengths of light (e.g., in embodiments where the light emitters 406 emit different wavelengths of light across the array of light emitters 406). To that end, for example, the array of light detectors 434 may include some SPADs that are sensitive to one range of wavelengths and other SPADs that are sensitive to a different range of wavelengths. In some embodiments, the light detectors 434 may be sensitive to wavelengths between 400 nm and 1.6 μm (visible and/or infrared wavelengths). Further, the light detectors 434 may have various sizes and shapes. For example, the light detectors 434 may include SPADs that have package sizes that are 1%, 0.1%, or 0.01% of the total area of the substrate 412. Still further, in some embodiments, one or more of the light detectors 434 may include detector-specific optics. For example, each of the light detectors 434 may include a micro-lens positioned over the light detector 434 to enhance the amount of received light that is transmitted to a detection surface of the light detector 434. Additionally or alternatively, one or more of the light detectors 434 may include one or more optical filters (e.g., neutral-density filter(s), polarization filter(s), and/or chromatic filter(s)).

The light detectors 434 illustrated in FIG. 5B may be arranged so as to correspond to the endpoints of the light-guide manifolds 408 on the substrate 412. As such, if the substrate 412 is sufficiently transparent or translucent so as to allow some light transmission, the light detectors 434 may detect light signals reflected from the surrounding environment and transmitted through the shared telecentric lens assembly 460, through the substrate 412, and then through the aperture plate 422 (as shown and described with reference to FIG. 5C). Hence, each of the light detectors 434 may correspond to one of the light emitters 406 (e.g., and one of the light-guide manifolds 408). For example, each of the light detectors 434 may be positioned above an output end of a light-guide manifold 408 that corresponds to one of the light emitters 406 (e.g., as shown and described with reference to FIG. 5D).

In some embodiments, each of the light detectors 434 may correspond to a respective light emitter 406 in the lidar device 400. In other embodiments, multiple light detectors 434 may correspond to a single light emitter 406 or a single light detector 434 may correspond to a multiple light emitters 406.

As with the light emitters 406 illustrated in FIG. 5A, the light detectors 434 may be divided into sub-arrays of light detectors 434. For example, a first sub-array of light detectors 434 may be defined on the right side of the substrate 412 and a second sub-array of light detectors 434 may be defined on the right side of the substrate 412. Further, the first sub-array of light detectors 434 may correspond to the first sub-array of light emitters 406 and the second sub-array of light detectors 434 may correspond to the second sub-array of light emitters 406. Similar to the sub-arrays of light emitters 406, the sub-arrays of light detectors 434 may be independently powered from one another. As described above, based on the difference in firing times between the first sub-array of light emitters 406 and the second sub-array of light emitters 406, the signal detections using the first sub-array of light detectors 434 and the second sub-array of light detectors 434 may also be staggered in time. Having multiple sub-arrays of light emitters 406 and light detectors 434 (especially sub-arrays that are independently powered) may also provide redundancy for detecting objects in the surrounding environment.

As with the light-guide manifolds 408 and the light emitters 406 illustrated in FIG. 5A, the number and position of the light detectors 434 in FIG. 5B is provided solely as an example. If the positions of the light-guide manifolds 408, the size/shape of the light-guide manifolds 408, the angles of the mirrors 409, the number of light-guide manifolds 408, etc. were to change, the number and/or locations of the light detectors 434 might change correspondingly.

As described above, the light emitters 406 may be configured to transmit light signals to a surrounding environment (e.g., based on the position and characteristics of the corresponding light-guide manifolds 408 and shared telecentric lens assembly 460) across a range of azimuthal and/or elevation angles. Similarly, based on the positions of the light detectors 434 relative to the shared telecentric lens assembly 460 (and the light-guide manifolds 408), the light detectors 434 may be arranged to receive light signals reflected from objects in the environment surrounding the lidar device 400 across the same range of azimuthal and/or elevation angles.

In some embodiments, one or more baffles may be positioned between one or more of the light detectors 434, one or more subsets of the light detectors 434 (e.g., between groupings of five light detectors 434), and/or between one or more sub-arrays of the light detectors 434 (e.g., between the first sub-array of light detectors 434 and the second sub-array of light detectors 434). Such baffles may be opaque to one or more wavelengths of the light signals emitted by the light emitters 406, for example. As such, the baffles may prevent cross-talk between receive channels, thereby preventing detection noise from adjacent receive channels based on light signals emitted by adjacent light emitters 406.

Figure 5C:
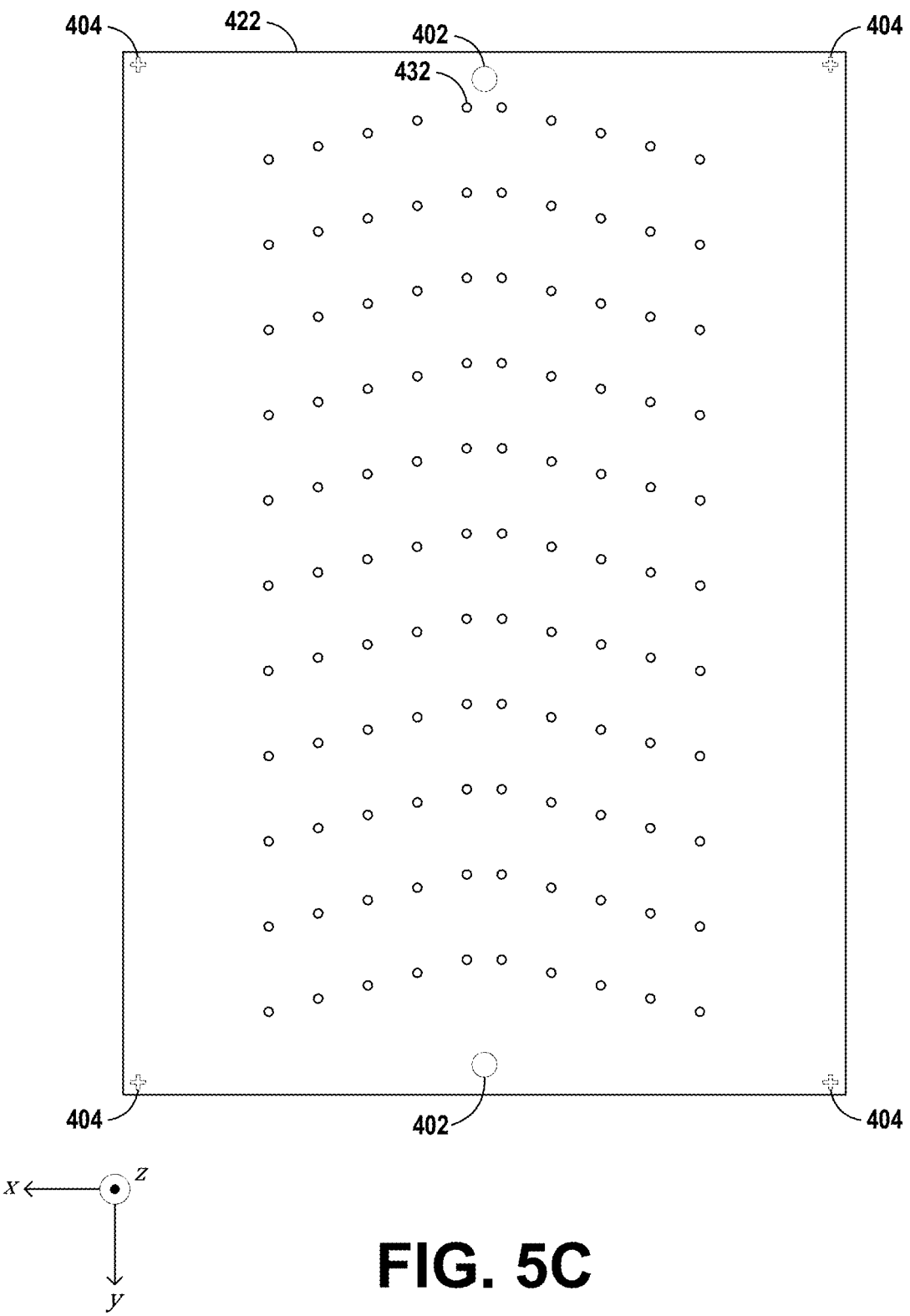
FIG. 5C is an illustration of an aperture plate, according to example embodiments.

FIG. 5C is an illustration of an aperture plate 422, according to example embodiments. The aperture plate 422 may be fabricated from an opaque material (e.g., a material that reflects and/or absorbs light of wavelengths emitted by the light emitters 406 of the lidar device 400). Like the substrate 412 illustrated in FIGS. 5A, the aperture plate 422 may include one or more mounting holes 402 and one or more alignment marks 404. As stated above, the mounting holes 402 may be used to affix and/or align the aperture plate 422 to the substrate 412 and/or the detector substrate 433 and the alignment marks 404 may assist in alignment. In some embodiments (e.g., to minimize noise in detected signals), the aperture plate 422 may be positioned at a focal plane of the shared telecentric lens assembly 460 (e.g., the aperture plate 422 may behave as an aperture stop for the lidar device 400).

As illustrated in FIG. 5C, the aperture plate 422 may have an array of apertures 432 defined therein. The apertures 432 may be located in the aperture plate 422 such that when the aperture plate 422 is aligned to the substrate 412, each aperture 432 overlays a corresponding end of a light-guide manifold 408 (e.g., overlays a mirror 409 at the end of the light-guide manifold 408, as illustrated in FIG. 5A) and/or a corresponding light detector 434. In this way, a light signal emitted from one of the light-guide manifolds 408 can be received through a corresponding aperture 432 one reflected from the surrounding environment. As illustrated in FIG. 4, the aperture plate 422 may be positioned between the substrate 412 and the detector substrate 433.

Figure 5D:
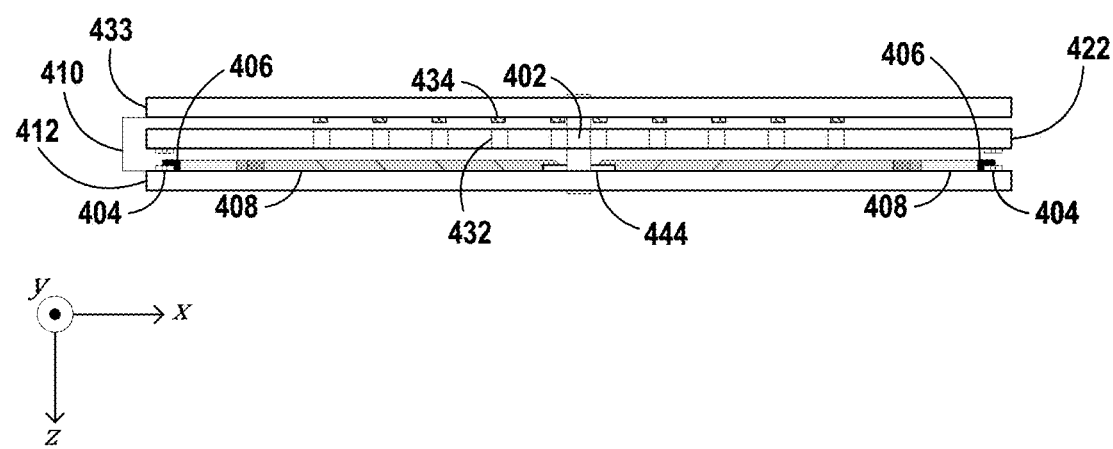
FIG. 5D is an illustration of a substrate and an aperture plate, according to example embodiments.

FIG. 5D is an illustration of a substrate, a detector substrate, and an aperture plate (e.g., from a bottom-view perspective), according to example embodiments. For example, FIG. 5D includes the substrate 412 illustrated in FIG. 5A, the detector substrate illustrated in FIG. 5B, and the aperture plate 422 illustrated in FIG. 5C. As illustrated in FIG. 5D, the aperture plate 422, the detector substrate 433, and the substrate 412 may be affixed to one another (e.g., using a bolt, screw, or other connector via the mounting holes 402 on the aperture plate 422, the detector substrate 433, and the substrate 412). The aperture plate 422, the detector substrate 433, and the substrate 412 may also be oriented such that the alignment marks 404 on each match up with one another, as illustrated.

As described above, the apertures 432 defined within the aperture plate 422 may be positioned above output ends of corresponding light-guide manifolds 408. In a related fashion, light detectors 434 may be positioned on the bottom side of the detector substrate 433 opposite the output ends of the light-guide manifolds 408. As such, the light detectors 434 may also be positioned above the apertures 432 defined within the aperture plate 422. Hence, the light detectors 434 may be configured to capture light signals reflected from objects in the surrounding environment once the reflected light signals pass through the respective portion of the substrate 412 (e.g., if the substrate 412 is transparent or has holes defined therein), through and/or around the respective output end of the light-guide manifold 408, and through the respective aperture 432. In some embodiments, light-sensitive surfaces of one or more of the light detectors 434 may face in the negative z-direction as illustrated in FIG. 5D (i.e., the light-sensitive surface may be a bottom surface of the respective light detector 434, as illustrated). Additionally or alternatively, light-sensitive surfaces of one or more of the light detectors 434 may face in the positive z-direction illustrated in FIG. 5D (i.e., the light-sensitive surface may be a top surface of the respective light detector 434, as illustrated).

Figure 6:
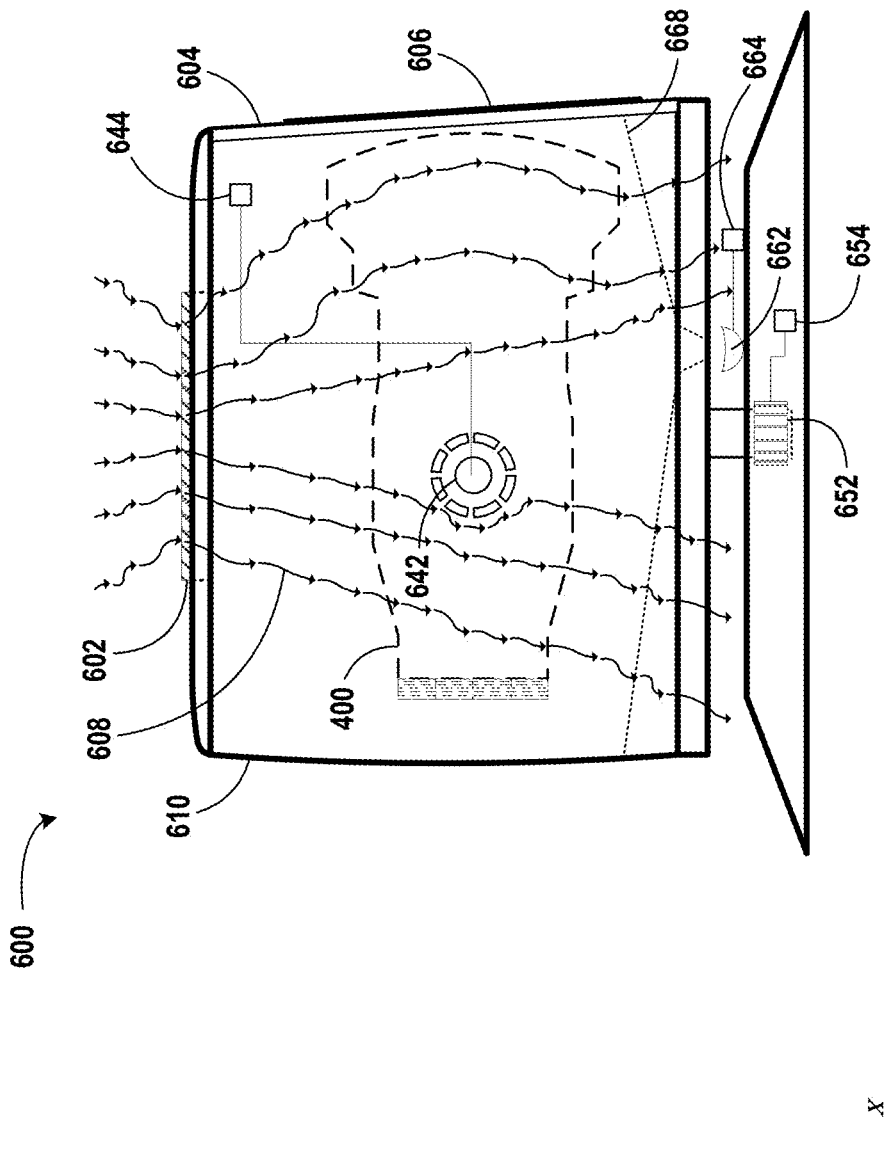
FIG. 6 is an illustration of a lidar, according to example embodiments.

FIG. 6 is an illustration of a lidar 600, according to example embodiments. The lidar 600 illustrated in FIG. 6 may include the lidar device 400 illustrated in FIG. 4 (e.g., including the substrate 412, the aperture plate 422, the detector substrate 433, the cooling component 452, the shared telecentric lens assembly 460, and the casing 470), as well as additional components. For example, the lidar 600 may include a protective housing 610 (e.g., which includes an additional cooling component 602 that drives airflow along airflow paths 608, an optical window 604, a window coating 606, and drip troughs 668), a water-collection tank 662 with an associated volume sensor 664, and a rotating stage 652 with an associated controller 654.

The protective housing 610 may encapsulate one or more components of the lidar device 400. For example, the protective housing 610 may encapsulate the array of light emitters 406, the array of astigmatic lenses (e.g., cylindrical lenses used to couple the light signals from the light emitters 406 into the light-guide manifolds 408), the shared telecentric lens assembly 460, the array of light detectors 434 on the detector substrate 433, and the aperture plate 422 so as to protect each of those components from potentially detrimental exposure to the environment. Additionally or alternatively, the protective housing 610 may encapsulate one or more additional sensors (e.g., one or more auxiliary sensors other than the light detectors 434 of the lidar device 400). For example, the protective housing 610 may encapsulate a thermometer, a barometer, a hygrometer, a radar unit for sensor objects in the surrounding environment, one or more additional lidar devices, GPS sensors, cameras, etc. Still further, the protective housing 610 may encapsulate one or more communication devices that allow the lidar 600 to communicate with one or more computing devices (e.g., computing devices of another lidar and/or a cloud computing device, such as a remotely located cloud server). In some embodiments, the lidar device 400 and/or one or more auxiliary sensors may be connected to external processing devices (e.g., an external computing device that generates a point cloud based on data captured by the lidar device 400). For example, the lidar device 400 may transmit data used to detect objects to an external processing device or storage device. Such data may include coordinates, distances, ranges, angles (e.g., yaw/azimuth angles and/or pitch/elevation angles), detected intensities, timestamps, normals, pulse widths, beam sizes, return indices, etc. In some embodiments, a rotary data link may be used to transmit such data from the protective housing 610 along a rotary axis connected to the rotating stage to an external device. For example, an interface waveguide may have two portions whose axes are aligned such that they can rotate adjacent to one another along the same rotary axis and communicate information to one another.

The protective housing 610 may also have one or more additional cooling component 602 defined therein (e.g., along a top side of the protective housing 610 as illustrated in FIG. 6) and/or thereon. The additional cooling component 602 may include one or more passive cooling components (e.g., a vent configured to permit airflow to cool the lidar 600 as a housing and/or the lidar device 400 is rotated about an axis, e.g., an elevation axis and/or an azimuthal axis). Additionally or alternatively, the additional cooling component 602 may include one or more active cooling components (e.g., a fan configured to force air through the protective housing 610 to cool the lidar device 400). Further, based on the location of the additional cooling component 602, one or more air outlets defined within the protective housing 610 (e.g., along a bottom side of the protective housing 610), and/or the internal design of the protective housing 610, the protective housing 610 may include predefined airflow paths 608 to enhance passive cooling of the lidar 600. The predefined airflow paths 608 may run along one or more components of the lidar device 400 (e.g., the light emitters 406 and/or the light detectors 434 on the substrate 412) to provide enhanced cooling to the one or more components.

As described herein, in some embodiments, it may be beneficial to maintain the emission wavelength(s) associated with one or more of the light emitters 406 within a narrow wavelength range. As such, it may be beneficial to maintain one or more of the light emitters 406 within a narrow temperature range (e.g., to maintain the narrow wavelength range for emission), regardless of an ambient temperature. For example, in embodiments where the light emitters 406 are laser diodes, it may be beneficial to maintain the light emitters 406 within a temperature range between approximately 55° C. and 65° C. (e.g., even for ambient temperatures between −30° C. and +65° C. One technique by which the temperature range of the light emitters 406 can be maintained may include air flowing through the lidar 600 (e.g., while the protective housing 610 of the lidar 600 rotates about its axis) to cool one or more components of the lidar 600 (such as the light emitters 406). Additionally or alternatively, the temperature range of the light emitters 406 may be maintained by actively heating or cooling the light emitters 406 (e.g., using a thermoelectric cooler, such as a Peltier element, operated in heat-pump mode, using a thermoelectric cooler, such as a Peltier element, operated in cooling mode, using a refrigeration device, and/or using a resistive heater). In still other embodiments, the emission characteristics of the light emitter 406 may be modulated to maintain the temperature range of the light emitters 406 (e.g., based on the waste heat given off by the light emitters 406 when emitting light signals). For example, a duty cycle and/or emission power may be modulated to adjust the waste heat given off by the light emitters 406 and, thereby, maintain the light emitters 406 within a given temperature range.

In some embodiments, there may be a strip of light-emitting diodes (e.g., three, four five, ten, fifteen, twenty, fifty, one-hundred, etc. diodes) positioned along the protective housing 600 (e.g., oriented vertically along the protective housing 600). The light-emitting diodes may be configured to selectively activate and deactivate to display an image or a message (e.g., a picture, an alert, a warning, or other information) to the environment around the lidar device as the protective housing 600 rotates (e.g., as the rotating stage 652 causes the protective housing 600 to rotate). Such a strip of light-emitting diodes may be controlled by an LED controller, for example.

In some embodiments, the lidar 600 may also include one or more optical windows 604. The optical windows may provide a surface that mechanically protects the components of the lidar device 400 without optically isolating the lidar device 400 from the surrounding environment. In other words, light signals emitted by the lidar device 400 may be able to pass through the optical window 604 to and from the environment.

In some embodiments, the optical window 604 may be covered with one or more optical components. For example, the optical window 604 may be covered with a window coating 606, such as an AR coating or a hydrophobic coating. Additionally or alternatively, the optical window 604 may be covered by an optical filter (e.g., a chromatic filter or a neutral-density filter) that absorbs (and/or reflects) light not emitted by the array of light emitters 406 in the lidar device 400 (e.g., light that is not within a wavelength range emitted by the light emitters 406). In some embodiments, the optical window(s) 604, themselves, may be fabricated from black glass so as to effectively transmit light of wavelengths emitted by the lidar device 400 (e.g., infrared wavelengths) while blocking transmission of other wavelengths (e.g., wavelengths in the visible spectrum).

In some embodiments, a wiper blade (e.g., with an associated actuator and controller) may be disposed on the optical window 604 so as to prevent debris from collecting on the optical window 604 and potentially obscuring measurements made by the lidar 600. Further, in some embodiments, the optical window(s) 604 may include one or more weatherproof (e.g., waterproof) coverings and/or one or more heated coverings (e.g., to prevent ice and/or frost from collecting on the optical window 604). Such heated coverings may be fabricated from ITO. Additionally or alternatively, in some embodiments, there may be one or more heating elements integrated into the optical window(s) 604 themselves (e.g., one or more heating coils within the optical window(s) 604).

The first rotational stage 642 may orient the lidar device 400 relative to the environment (e.g., in an elevation direction). In various embodiments, the first rotational stage 642 may be configured to rotate the lidar device 400 between −15.0° and 15.0°, between −5.0° and 5.0°, between −30.0° and 30.0°, between −45.0° and 0.0°, between −20.0° and 10.0°, etc. relative to the horizon of the surrounding environment. Other angular ranges are also possible. The first rotational stage 642 may include one or more actuators (e.g., electric motors, such as servos). Further, the first rotational stage 642 may be controlled by the first controller 644 so as to orient the lidar device 400 in elevation based on a predetermined pattern (e.g., stored in a memory within or associated with the first controller 644). The first controller 644 may be configured to communicate with the associated controller 654, with a controller associated with the firing circuit 444, and/or with the control system 106 (e.g., as illustrated in FIG. 1). In alternate embodiments the first rotational stage may orient the entire protective housing 610 (rather than solely the lidar device 400 illustrated in FIG. 6).

Similarly, the rotating stage 652 may be configured to orient the protective housing 610 (or solely the lidar device 400) relative to the environment (e.g., in an azimuthal direction). In various embodiments, the rotating stage 652 may be configured to rotate the lidar device 400 between 0.0° and 180.0° (half-azimuthal rotation), between 0.0° and 360.0° (complete azimuthal rotation), between 0.0° and 90.0°, between 0.0° and 135.0°, etc. Other angular ranges are also possible. When the rotating stage 652 causes the protective housing 610 to rotate relative to a surrounding environment, the lidar device 600 may be cooled (e.g., based on air being forced through the predefined airflow paths 608). The rotating stage 652 may include one or more actuators (e.g., electric motors, such as servos). Further, the rotating stage 652 may be controlled by the associated controller 654 so as to orient the protective housing 610 (or the lidar device 400) in azimuth based on a predetermined pattern (e.g., stored in a memory within or associated with the associated controller 654). The associated controller 654 may be configured to communicate with the first controller 644, with a controller associated with the firing circuit 444, and/or with the control system 106 (e.g., as illustrated in FIG. 1).

The water-collection tank 662 may be used to determine how much condensation, frost, ice, snow, rain, etc. has collected on and/or in the protective housing 610 (e.g., that has dripped from components within the lidar 600 and/or, specifically, the lidar device 400). For example, any rain that enters the protective housing 610 may proceed down a drip trough 668 and into the water-collection tank 662. Then, using the associated volume sensor 664 the amount of water collected in the water-collection tank 662 may be determined. If the amount of water collected reaches a threshold value (e.g., as determined by a controller associated with the water-collection tank 662, the lidar device 400, or an associated autonomous vehicle), the lidar 600 may be decommissioned for cleaning and/or replacement. Additionally or alternatively, based on the amount of water collected in the water-collection tank 662, a confidence value for three-dimensional point clouds generated using the lidar device 400 may be determined.

III. EXAMPLE PROCESSES

Figure 7:
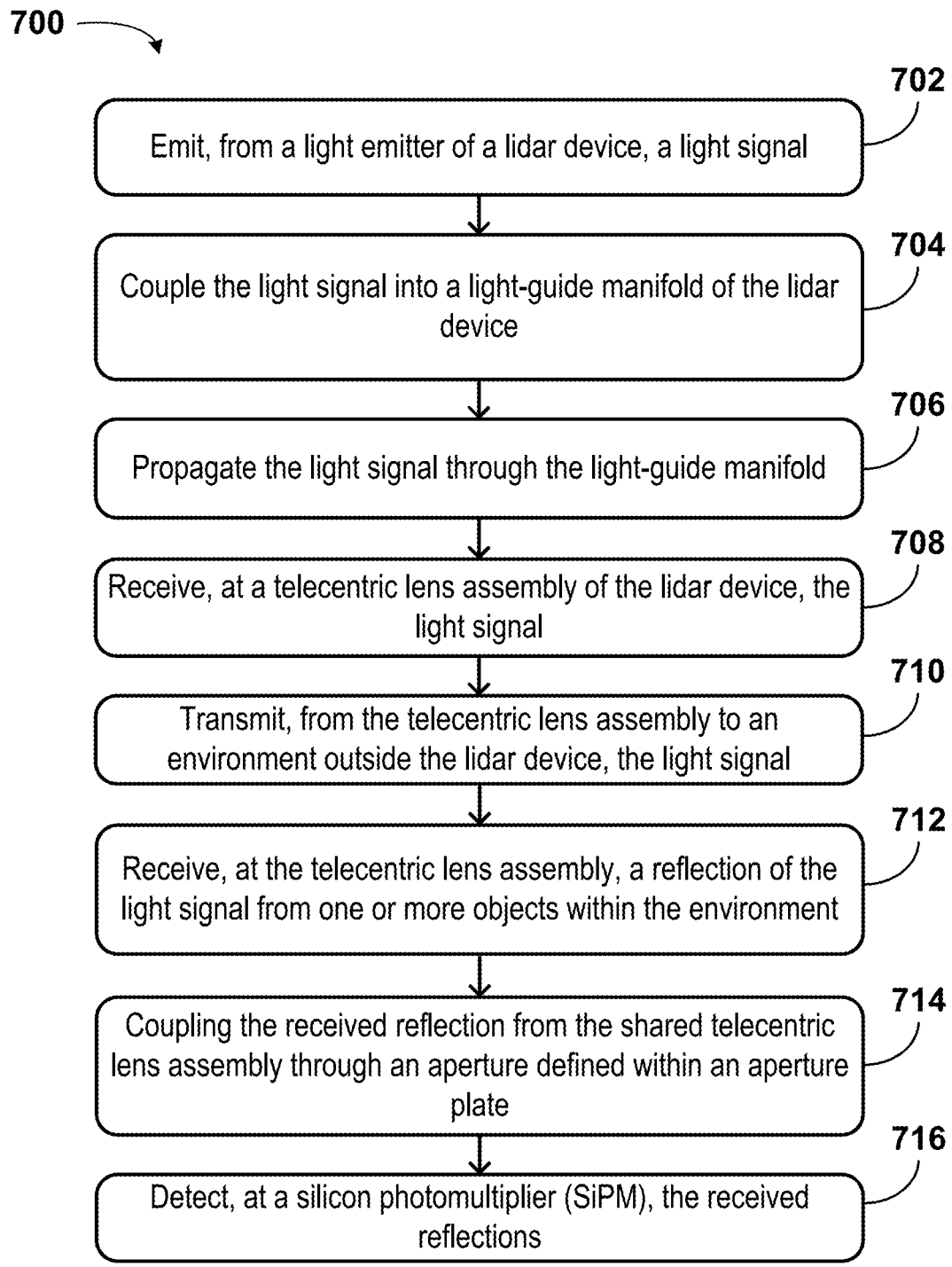
FIG. 7 is an illustration of a method, according to example embodiments.

FIG. 7 is a flowchart diagram of a method 700, according to example embodiments. In some embodiments, one or more of the blocks of FIG. 10 may be performed by a computing device (e.g., a controller of the lidar device 400). The computing device may include computing components such as a non-volatile memory (e.g., a hard drive or a read-only memory (ROM)), a volatile memory (e.g., a random-access memory (RAM), such as dynamic random-access memory (DRAM) or static random-access memory (SRAM)), a user-input device (e.g., a mouse or a keyboard), a display (e.g., an LED display or an LCD), and/or a network communication controller (e.g., a WIFI® controller, based on IEEE 802.11 standards, or an Ethernet controller). The computing device, for example, may execute instructions stored on a non-transitory, computer-readable medium (e.g., a hard drive) to perform one or more of the operations contemplated herein.

At block 702, the method 700 may include emitting, from a light emitter of a lidar device, a light signal.

At block 704, the method 700 may include transmitting the light signal into a light-guide manifold of the lidar device.

At block 706, the method 700 may include propagating the light signal through the light-guide manifold.

At block 708, the method 700 may include receiving, at a telecentric lens assembly of the lidar device, the light signal.

At block 710, the method 700 may include transmitting, from the telecentric lens assembly to an environment outside the lidar device, the light signal.

At block 712, the method 700 may include receiving, at the telecentric lens assembly, a reflection of the light signal from one or more objects within the environment.

At block 714, the method 700 may include transmitting the received reflection from the telecentric lens assembly through an aperture defined within an aperture plate. The aperture plate may be positioned at a focal plan of the telecentric lens assembly.

At block 716, the method 700 may include detecting, at a silicon photomultiplier (SiPM), the received reflection.

IV. CONCLUSION

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. In the figures, similar symbols typically identify similar components, unless context dictates otherwise. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the message flow diagrams, scenarios, and flow charts in the figures and as discussed herein, each step, block, operation, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step, block, or operation that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer-readable medium such as a storage device including RAM, a disk drive, a solid state drive, or another storage medium.

Moreover, a step, block, or operation that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

What is claimed is:

1. A light detection and ranging (lidar) device comprising:
a transmit subsystem comprising:
a light emitter;
a light-guide manifold optically coupled to the light emitter; and
a telecentric lens assembly optically coupled to the light-guide manifold; and
a receive subsystem comprising:
the telecentric lens assembly;
an aperture plate having an aperture defined therein, wherein the aperture plate is positioned at a focal plane of the telecentric lens assembly; and
a silicon photomultiplier (SiPM) positioned to receive light traveling through the aperture, wherein the telecentric lens assembly comprises at least one lens element optically coupled to both the light emitter and the SiPM.

2. The lidar device of claim 1,
wherein the light-guide manifold comprises an optical waveguide, and
wherein the light-guide manifold is positioned to direct light received from the light emitter to the telecentric lens assembly through total internal reflection.

3. The lidar device of claim 1,
wherein the telecentric lens assembly is positioned to receive light signals from the light-guide manifold and transmit the light signals toward an environment outside of the lidar device, and
wherein the telecentric lens assembly is positioned to receive light signals reflected from objects in the environment and transmit the light signals reflected from objects in the environment through the aperture to the SiPM.

4. The lidar device of claim 1, wherein the transmit subsystem further comprises an astigmatic lens positioned to couple light signals from the light emitter into the light-guide manifold.

5. The lidar device of claim 1,
wherein the light emitter is one of an array of light emitters, each configured to emit a light signal,
wherein the SiPM is one of an array of SiPMs,
wherein the light-guide manifold is one of an array of light-guide manifolds,
wherein the aperture is one of an array of apertures defined in the aperture plate, and
wherein each aperture in the array corresponds to one of the SiPMs.

6. The lidar device of claim 5,
wherein the light-guide manifolds are arranged to emit the light signals across a range of elevation angles, and
wherein the SiPMs are arranged to receive the light signals reflected from an environment outside the lidar device across the range of elevation angles.

7. The lidar device of claim 5, wherein the array of light emitters comprises a first sub-array of light emitters and a second sub-array of light emitters that are independently powered.

8. The lidar device of claim 7, wherein the second sub-array of light emitters is configured to be fired at a delay with respect to a firing of the first sub-array of light emitters.

9. The lidar device of claim 5, wherein the array of SiPMs comprises a first sub-array of SiPMs and a second sub-array of SiPMs.

10. The lidar device of claim 9, wherein the first sub-array of SiPMs is independently powered from the second sub-array of SiPMs.

11. The lidar device of claim 5, further comprising one or more baffles configured to prevent detection noise from light signals emitted by adjacent light emitters.

12. The lidar device of claim 5,
wherein each of the SiPMs corresponds to one of the light emitters,
wherein each of the light-guide manifolds corresponds to one of the light emitters, and
wherein each of the SiPMs is positioned on an opposite side of a substrate from one end of a light-guide manifold that corresponds to the light emitter corresponding to the respective SiPM.

13. The lidar device of claim 1, wherein the transmit subsystem further comprises:
a firing circuit configured to control the light emitter; and
a controller configured to:
control the firing circuit via firing-control signals;
receive electronic signals from the SiPM; and transmit data used to detect objects in an environment outside the lidar device based on the received electronic signals and the firing-control signals.

14. The lidar device of claim 1, wherein the light emitter comprises a laser diode.

15. The lidar device of claim 1, wherein the telecentric lens assembly comprises cascaded lens elements.

16. The lidar device of claim 1, further comprising a protective housing configured to encapsulate the transmit subsystem and the receive subsystem, wherein the protective housing encapsulates additional sensors.

17. The lidar device of claim 16, further comprising:
a rotating stage configured to rotate the protective housing relative to an environment outside the lidar device; and
an associated controller configured to control the rotating stage.

18. The lidar device of claim 17, wherein rotating the protective housing relative to the environment cools the lidar device using predefined airflow paths within the lidar device.

19. The lidar device of claim 16, wherein the protective housing comprises one or more optical windows.

20. The lidar device of claim 19, wherein the one or more optical windows are covered with an anti-reflective (AR) coating or an optical filter that reflects or absorbs light not emitted by the light emitter.

21. The lidar device of claim 19, wherein the one or more optical windows are heated, coated with indium tin oxide (ITO), or coated with a hydrophobic coating.

22. The lidar device of claim 1, further comprising:
a protective housing configured to encapsulate the transmit subsystem and the receive subsystem, wherein the protective housing is configured to rotate relative to an environment outside the lidar device; and
a plurality of light-emitting diodes positioned in a strip along the protective housing, wherein the light-emitting diodes are configured to selectively activate and deactivate to display an image or a message to the environment as the protective housing rotates.

23. The lidar device of claim 1, further comprising a water-collection tank configured to capture water that drips from components of the lidar device.

24. The lidar device of claim 23, further comprising a volume sensor attached to the water-collection tank, wherein the volume sensor is configured to determine when the water-collection tank contains a threshold amount of water.

25. A method comprising:
emitting, from a light emitter of a lidar device, a light signal;
transmitting the light signal into a light-guide manifold of the lidar device;
propagating the light signal through the light-guide manifold;
receiving, at a telecentric lens assembly of the lidar device, the light signal;
transmitting, from the telecentric lens assembly to an environment outside the lidar device, the light signal;
receiving, at the telecentric lens assembly, a reflection of the light signal from one or more objects within the environment;
transmitting the received reflection from the telecentric lens assembly through an aperture defined within an aperture plate, wherein the aperture plate is positioned at a focal plane of the telecentric lens assembly; and
detecting, at a silicon photomultiplier (SiPM), the received reflection, wherein the telecentric lens assembly comprises at least one lens element optically coupled to both the light emitter and the SiPM.

26. A non-transitory, computer-readable medium having instructions stored therein, wherein the instructions, when executed by a processor, perform a method comprising:
controlling a firing circuit to cause a light emitter of a lidar device to emit a light signal,
wherein the light signal is:
transmitted into a light-guide manifold of the lidar device;
propagated through the light-guide manifold;
received at a telecentric lens assembly of the lidar device; and
transmitted from the telecentric lens assembly to an environment outside the lidar device,
wherein a reflection of at least a portion of the light signal from one or more objects within the environment is received at the telecentric lens assembly,
wherein the received reflection is coupled from the telecentric lens assembly through an aperture defined within an aperture plate, and
wherein the received reflection is detected at a silicon photomultiplier (SiPM); and
determining, based on the detection of the received reflection, a distance to the one or more objects in the environment, wherein the telecentric lens assembly comprises at least one lens element optically coupled to both the light emitter and the SiPM.

* * * * *